US008667192B2

(12) United States Patent
Allaire et al.

(10) Patent No.: US 8,667,192 B2
(45) Date of Patent: *Mar. 4, 2014

(54) INTEGRATED CIRCUIT WITH PROGRAMMABLE CIRCUITRY AND AN EMBEDDED PROCESSOR SYSTEM

(75) Inventors: William E. Allaire, West Chester, PA (US); Bradley L. Taylor, Santa Cruz, CA (US); Ting Lu, Austin, TX (US); Sandeep Dutta, Foster City, CA (US); Patrick J. Crotty, San Jose, CA (US); Hassan K. Bazargan, Saratoga, CA (US); Hy V. Nguyen, San Jose, CA (US); Shashank Bhonge, Bangalore (IN)

(73) Assignee: Xilinx, Inc., San Jose, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 13/037,234

(22) Filed: Feb. 28, 2011

(65) Prior Publication Data

US 2012/0221833 A1  Aug. 30, 2012

(51) Int. Cl.
*G06F 13/00* (2006.01)
*G06F 12/00* (2006.01)
*G06F 13/24* (2006.01)
*G06F 1/00* (2006.01)
*H03K 19/173* (2006.01)

(52) U.S. Cl.
USPC ........... 710/104; 710/200; 710/260; 713/324; 326/37

(58) Field of Classification Search
USPC ......... 710/100, 104, 306, 312, 316, 200, 260; 713/300, 324, 500, 501; 326/37, 39
See application file for complete search history.

(56) References Cited

U.S. PATENT DOCUMENTS

| | | | |
|---|---|---|---|
| 5,581,482 A | 12/1996 | Wiedenman et al. | |
| 5,835,702 A | 11/1998 | Levine et al. | |
| 5,867,644 A | 2/1999 | Ranson et al. | |
| 6,351,724 B1 | 2/2002 | Klassen et al. | |
| 6,662,302 B1 | 12/2003 | Garey | |
| 6,785,107 B1 * | 8/2004 | Schmitt | 361/91.1 |
| 6,803,785 B1 | 10/2004 | May et al. | |
| 6,948,147 B1 * | 9/2005 | New et al. | 716/117 |
| 7,026,840 B1 | 4/2006 | May et al. | |
| 7,143,218 B1 * | 11/2006 | Yin et al. | 710/107 |
| 7,225,285 B1 * | 5/2007 | Fairman et al. | 710/266 |

(Continued)

OTHER PUBLICATIONS

Leibson, Steve. "Designing Low-Power Systems with FPGAs". Low-PowerDesign. Online Feb. 1, 2010. Retreived from Internet May 3, 2013. <http://low-powerdesign.com/sleibson/2010/02/01/designing-low-power-systems-with-fpgas>.*

(Continued)

*Primary Examiner* — Thomas J Cleary
(74) *Attorney, Agent, or Firm* — Kevin T. Cuenot

(57) ABSTRACT

An integrated circuit can include a processor system configured to execute program code. The processor system can be hard-wired and include a processor hardware resource. The IC also can include a programmable circuitry configurable to implement different physical circuits. The programmable circuitry can be coupled to the processor system. The programmable circuitry can be configurable to share usage of the processor hardware resource of the processor system. The processor system further can control aspects of the programmable circuitry such as power on and/or off and also configuration of the programmable circuitry to implement one or more different physical circuits therein.

19 Claims, 13 Drawing Sheets

(56) References Cited

U.S. PATENT DOCUMENTS

| | | | |
|---|---|---|---|
| 7,274,212 B1* | 9/2007 | Burney et al. | 326/39 |
| 7,308,564 B1 | 12/2007 | Jenkins, IV | |
| 7,492,183 B2 | 2/2009 | Balasubramanian et al. | |
| 7,512,813 B2* | 3/2009 | Goodnow et al. | 713/193 |
| 7,673,164 B1 | 3/2010 | Agarwal | |
| 7,724,028 B1 | 5/2010 | Ansari et al. | |
| 7,853,809 B2 | 12/2010 | Zhang et al. | |
| 7,992,020 B1 | 8/2011 | Tuan et al. | |
| 8,156,355 B2 | 4/2012 | Mendel et al. | |
| 2003/0062922 A1 | 4/2003 | Douglass et al. | |
| 2003/0163298 A1 | 8/2003 | Odom et al. | |
| 2004/0230771 A1 | 11/2004 | Borgatti et al. | |
| 2004/0236893 A1* | 11/2004 | May et al. | 710/306 |
| 2007/0079148 A1* | 4/2007 | Pastorello et al. | 713/300 |
| 2008/0048715 A1* | 2/2008 | Balasubramanian et al. | 326/37 |
| 2010/0095145 A1 | 4/2010 | Chan et al. | |
| 2010/0194200 A1* | 8/2010 | Kwon et al. | 307/52 |
| 2012/0033508 A1* | 2/2012 | Adams et al. | 365/189.11 |
| 2012/0185719 A1* | 7/2012 | Taylor et al. | 713/324 |

OTHER PUBLICATIONS

Leibson, Steve. "Designing Low-Power Systems with FPGAs, Part 2". Low-PowerDesign. Online Feb. 1, 2010. Retreived from Internet May 3, 2013. <http://low-powerdesign.com/sleibson/2010/02/01/designing-low-power-systems-with-fpgas-part-2>.*

Leibson, Steve. "Xilinx redefines the high-end microcontroller with its ARM-based Extensible Processing Platform—Part 1". Low-PowerDesign. Online May 1, 2010. Retreived from Internet May 3, 2013. <http://low-powerdesign.com/sleibson/2010/02/01/xilinx-redefines-the-high-end-microcontroller-with-its-extensible-processing-platform—part-1>.*

Leibson, Steve. "Xilinx redefines the high-end microcontroller with its ARM-based Extensible Processing Platform—Part 2". Low-PowerDesign. Online May 1, 2010. Retreived from Internet May 3, 2013. <http://low-powerdesign.com/sleibson/2010/02/01/http://low-powerdesign.com/sleibson/2010/05/01/xilinx-redefines-the-high-end-microcontroller-with-its-arm.*

Nass, Rich, "Xilinx puts ARM Core into its FPGAs", EE Times, 2 pp., printed from website on Jan. 31, 2011, http://www.eetimes.com/electronics-products/processors/4115523/Xilinx-puts-ARM-core-into-its-FPGAs.

Taylor, Brad and Wittig, Ralph, "28nm Generation Programmable Families", 7 Series FPGAs, Extensible Processing Platform Family, AMBA AX14 IP, Aug. 8, 2010, pp. 1-25, Xilinx, 2100 Logic Drive, San Jose, CA 95124.

U.S. Appl. No. 12/913,713, Lu, Ting, et al., filed Oct. 27, 2010, Xilinx, Inc., 2100 Logic Drive, San Jose, CA 95124 USA.

U.S. Appl. No. 13/005,941, Taylor, Bradley, L., et al., filed Jan. 13, 2011, Xilinx, Inc., 2100 Logic Drive, San Jose, CA 95124 USA.

U.S. Appl. No. 13/005,962, Taylor, Bradley, L., et al., filed Jan. 13, 2011, Xilinx, Inc., 2100 Logic Drive, San Jose, CA 95124 USA.

U.S. Appl. No. 13/005,994, Taylor, Bradley, L., et al., filed Jan. 13, 2011, Xilinx, Inc., 2100 Logic Drive, San Jose, CA 95124 USA.

* cited by examiner

INTEGRATED CIRCUIT WITH PROGRAMMABLE CIRCUITRY AND AN EMBEDDED PROCESSOR SYSTEM

FIELD OF THE INVENTION

One or more embodiments disclosed within this specification relate to integrated circuits (ICs). More particularly, one or more embodiments relate to an IC that includes a programmable circuitry and an embedded processor system.

BACKGROUND

Integrated circuits (ICs) can be implemented to perform specified functions. One type of IC is a programmable IC such as, e.g., a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect circuitry and programmable logic circuitry are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable including, for example, application specific integrated circuits (ASICs). For instance, another type of programmable IC includes a combination of hard-coded transistor logic and a programmable switch fabric that programmably interconnects the hard-coded transistor logic.

Some modern ICs, including some of the varieties of ICs discussed above, include an embedded processor that is capable of executing program code. The processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring programmable circuitry of an IC results in the implementation of different physical circuitry as specified by the configuration data within the programmable circuitry.

SUMMARY

One or more embodiments disclosed within this specification relate to integrated circuits (ICs) and, more particularly, to an IC that includes a programmable circuitry and an embedded processor system.

An embodiment can include an IC that includes a processor system configured to execute program code. The processor system can be hard-wired and can include a processor hardware resource. The IC also can include a programmable circuitry configurable to implement different physical circuits. The programmable circuitry can be coupled to the processor system. The programmable circuitry also can be configured to share usage of the processor hardware resource of the processor system.

Another embodiment can include an IC that includes a processor system that is configured to execute program code. The processor system can be hard-wired. The IC can include a programmable circuitry configurable to implement a physical circuit specified by configuration data. The programmable circuitry can be coupled to the processor system. The programmable circuitry also can implement the physical circuitry under the control of the processor system.

Another embodiment can include an IC having a processor system configured to execute program code. The processor system can be hard-wired. The IC can also include a programmable circuitry configurable to implement different physical circuits according to configuration data loaded therein. The programmable circuitry can be coupled to the processor system. The programmable circuitry can be powered, e.g., powered on and/or powered off, under control of the processor system.

DETAILED DESCRIPTION OF THE DRAWINGS

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to integrated circuits (ICs) and, more particularly, to an IC that includes a programmable circuitry and an embedded processor system. Incorporation of a programmable circuitry with an embedded processor system within the same IC and, for example, upon the same die and/or substrate, can facilitate sharing of various processor hardware resources between the programmable circuitry and the processor system. For example, various components and/or subsystems of the processor system such as memories, interfaces, e.g., input/output (I/O) devices, of the processor system can be made available for use by the programmable circuitry and shared.

One or more embodiments disclosed within this specification also relate to power management within an IC that includes a processor system and a programmable circuitry portion. The programmable circuitry can be configured to be powered on and/or off independently of the processor system. The processor system can be tasked with managing power cycling of the programmable circuitry and further can control configuration, e.g., the loading of configuration data, into the IC and configuration memory that controls the programmable circuitry. Power independence between the processor system and the programmable circuitry allows the processor system to operate and execute program code while the programmable circuitry remains powered off. To the extent that a processor hardware resource is shared with the programmable circuitry, power management of such resources also can be controlled by the processor system.

Figure 1:
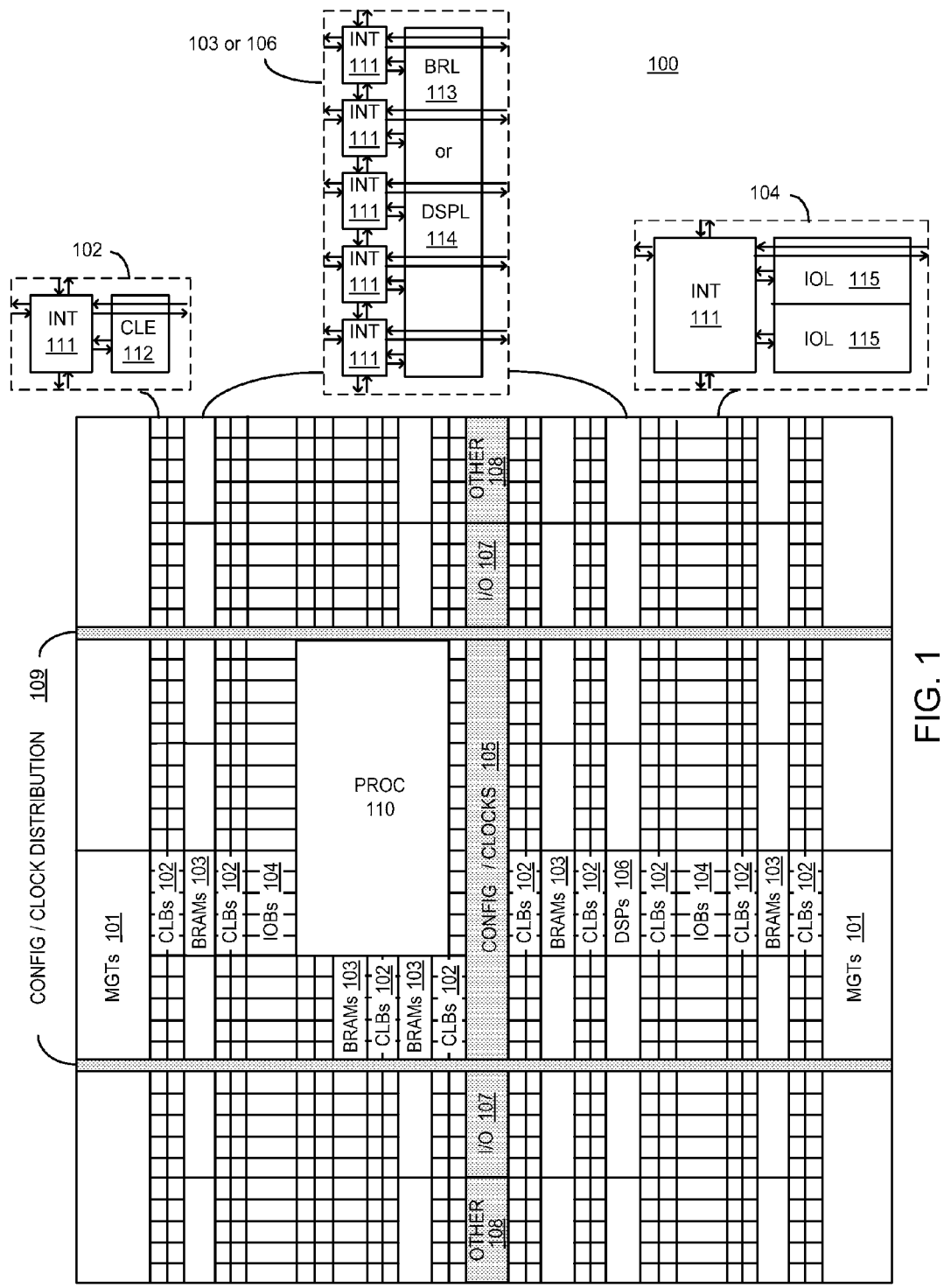
FIG. 1 is a first block diagram illustrating an architecture for an integrated circuit (IC) in accordance with an embodiment disclosed within this specification.

FIG. 1 is a first block diagram illustrating an architecture 100 for an IC in accordance with an embodiment disclosed within this specification. Architecture 100 can be implemented within a field programmable gate array (FPGA) type of IC, for example. As shown, architecture 100 includes several different types of programmable circuit, e.g., logic, blocks. For example, architecture 100 can include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, the INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs 111 included in a tile depends on the height of the tile. In the pictured embodiment, a BRAM tile has the same height as five CLBs, but other numbers (e.g., four) can also be used. A DSP tile 106 can include a DSP logic element (DSPL) 114 in addition to an appropriate number of INTs 111. An IOB 104 can include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die (shown shaded in FIG. 1) is used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks can be programmable blocks and/or dedicated circuitry. For example, a processor block depicted as PROC 110 spans several columns of CLBs and BRAMs.

PROC 110 can be implemented as a hard-wired processor that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In a more complex arrangement, for example, PROC 110 can include one or more cores, e.g., central processing units, cache memories, a memory controller, unidirectional and/or bidirectional interfaces configurable to couple directly to I/O pins, e.g., I/O pads, of the IC and/or couple to the programmable circuitry of the IC. The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 can be considered part of the, or the, programmable circuitry of the IC.

FIG. 1 is intended to illustrate an exemplary architecture that can be used to implement an IC that includes programmable circuitry, e.g., a programmable fabric, and a processor system. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of PROC 110 within the IC is for purposes of illustration only and is not intended as a limitation of the one or more embodiments disclosed within this specification.

Figure 2:
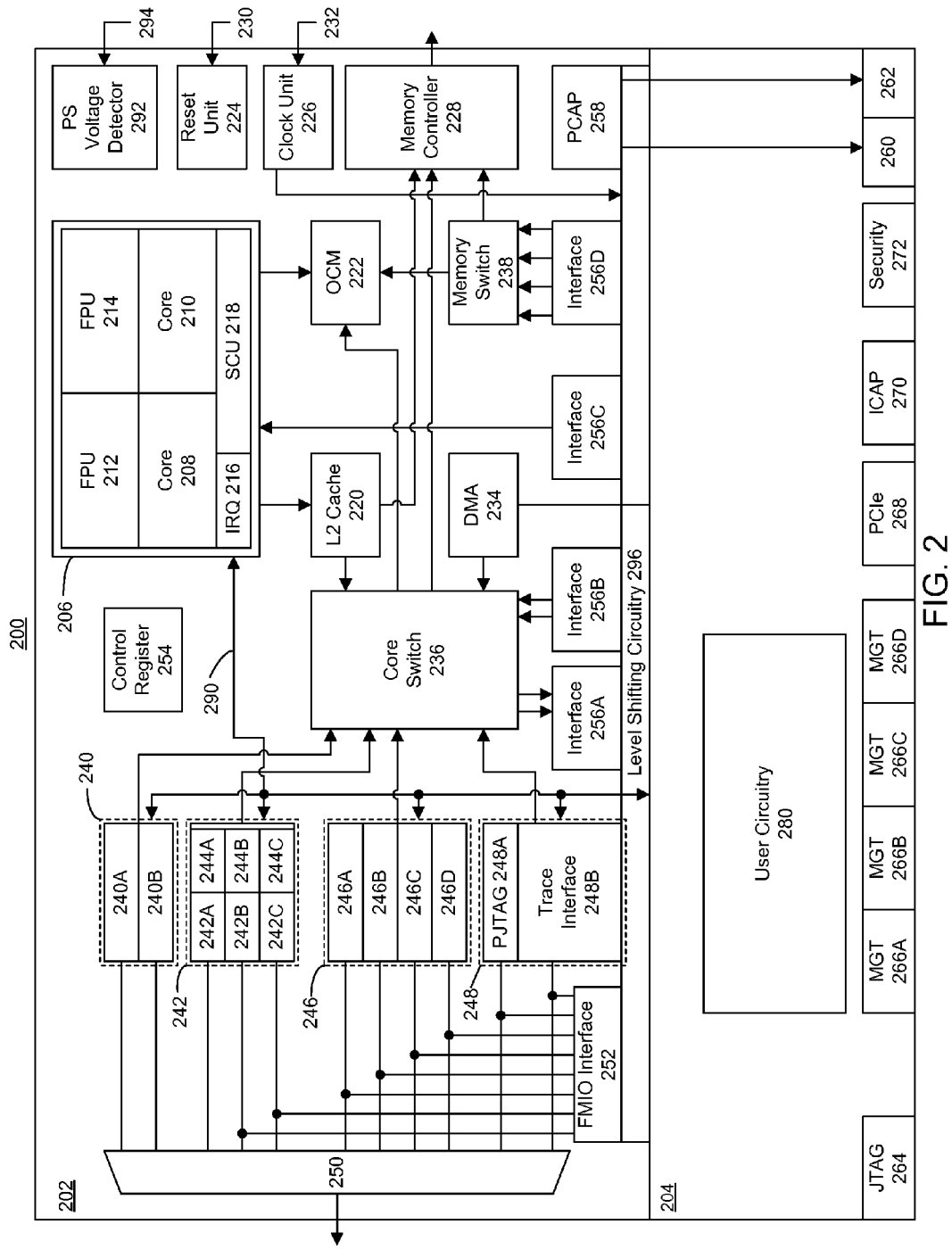
FIG. 2 is a second block diagram illustrating an IC configured in accordance with another embodiment disclosed within this specification.

FIG. 2 is a second block diagram illustrating an IC 200 configured in accordance with another embodiment disclosed within this specification. IC 200 can be implemented using any of a variety of different architectures that include a processor system (PS) 202 coupled to a programmable circuitry 204. For example, IC 200 can be implemented using an architecture that is the same as, or similar to, that of architecture 100 of FIG. 1, though this need not be the case. In general, IC 200 illustrates the various interfaces that can be used to couple PS 202 with circuitry implemented within programmable circuitry 204 in greater detail.

In the example shown in FIG. 2, PS 202 is illustrated as occupying approximately two-thirds of the die of IC 200, while programmable circuitry 204 is shown as occupying approximately one-third of the same die. FIG. 2 is not, however, intended to be a scale representation of IC 200. Rather, FIG. 2 is provided for purposes of illustration and is not intended as a limitation of the one or more embodiments disclosed within this specification.

In general, PS 202 is implemented as a hard-wired system within IC 200. To the extent that various components or modules within PS 202 are coupled by lines, e.g., signal or communication links, that have arrows, such arrows are intended to illustrate the direction or flow of control. In this regard, a signal illustrated as a line with a directional arrow generally indicates that control over the signal is exerted by the source component from which the arrow emanates rather than the target component to which the arrow points. The arrows, in general, are not intended to indicate one-way flow of data or directionality of the signal. Signals can be implemented as bidirectional signals or communication links despite the presence of the directional arrow.

Within this specification, the same reference characters are used to refer to terminals, signal lines, wires, and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal, as noted, may represent bidirectional communication between two, or more, components connected by that signal or wire as the case may be.

As shown, PS 202 can include a core complex 206. Core complex 206 can include cores 208 and 210, floating point units (FPUs) 212 and 214, an interrupt request unit (IRQ) 216, and a snoop control unit (SCU) 218. Each of cores 208 and 210 can include a level 1 (L1) cache (not shown) embedded therein. While any of a variety of different types of processor cores capable of executing program code and/or FPUs, e.g., math co-processors or DSP units, can be used, in an embodiment disclosed herein, cores 208 and 210 each can be implemented as an ARM Cortex™. A9 type of processor core with each having a 32 KB instruction cache and a 32 KB data cache. FPUs 212 and 214 can be implemented in the form of NEON™ media and/or floating point processing engines capable of providing 128-bit vector-based DSP functions. The ARM Cortex™-A9 processor cores and the NEON™ media and/or floating point processing engines are available from ARM Holdings of Cambridge, UK (ARM).

While illustrated as a dual core or a multi-core system, in another embodiment, core complex 206 can include a single core that can execute program code. In that case, core complex 206 can include the single core or processor coupled to IRQ 216 and SCU 218. Further, FPUs 212 and 214 need not be included, though a single FPU unit can be included and coupled to the single core if desired.

Referring again to FIG. 2, core complex 206 is coupled to various processor hardware resources such as a level 2 (L2) cache 220 and an on-chip memory (OCM) 222. L2 cache 220 can be implemented as a 256 KB memory. OCM 222 also can be implemented as a 256 KB memory. Cores 208 and 210 and FPUs 212 and 214 can directly access L2 cache 220 and OCM 222. In general, OCM 222 provides local memory that is available to PS 202 and/or to programmable circuitry 204, e.g., circuits implemented within programmable circuitry 204. By comparison, L2 cache 220, which is also a memory, functions as a cache for PS 202. Accordingly, L2 cache 220 can store small blocks or portions of data, e.g., 256 bits, which are effectively copies of data bits stored in RAM, e.g., execution memory off-chip. If, for example, a read request is issued for data stored in L2 cache 220, the data can be read from L2 cache 220 as opposed to being retrieved from the RAM.

PS 202 can include further hardware processor resources such as a reset unit 224, a clock unit 226, and a memory controller 228. Reset unit 224 can receive one or more signals originating from a source external to IC 200, e.g., signal 230. Signal 230 can instruct reset unit 224 to reset PS 202 and/or one or more or all of the components within PS 202. Reset unit 224 further can receive signals requesting powering on or off of programmable circuitry 204.

Clock unit 226 can receive one or more reference signals, e.g., signal 232, from a source external to IC 200. Clock unit 226, for example, can be implemented as, or include, phase-lock loop circuitry capable of synchronizing to received signal 232. Clock unit 226 can generate one or more clock signals of one or more different frequencies that can be distributed throughout PS 202 (not shown). Further, clock unit 226 can generate one or more clock signals of one or more different frequencies that can be distributed to programmable circuitry 204 for use by circuits implemented therein.

Memory controller 228 can be implemented to communicate with one or more different types of RAMs located external to IC 200, e.g., "off-chip." For example, memory controller 228 can be implemented to access, e.g., read and/or write, various types of memory including, but not limited to, Dual Data Rate (DDR) 2, DDR3, Low Power (LP) DDR2 types of memory, whether 16-bit, 32-bit, 16-bit with ECC, etc. The list of different memory types with which memory controller 228 is able to communicate is provided for purposes of illustration only and is not intended as a limitation or to be exhaustive.

PS 202 also can include hardware processor resources such a direct memory access (DMA) interface 234 that is coupled to a core switch 236 and to programmable circuitry 204. PS 202 further includes a memory switch 238 type of hardware processor resource that couples to one of interfaces 256, i.e., interface 256D, to be described within this specification in greater detail, OCM 222, and memory controller 228.

Core switch 236 can route signals among various components of PS 202 as shown. In an embodiment, core switch 236 can be coupled directly to an internal bus of PS 202 (not shown). In such an embodiment, each other component within PS 202 that connects with core switch 236 can be coupled to core switch 236 through the internal bus. For example, other processor hardware resources such as I/O devices (e.g., interfaces) 240, 242, 246, and 248 each can couple to core switch 236 via the internal bus. The internal bus can be implemented as any of a variety of different buses such as, for example, an Advanced Peripheral Bus (APB), or the like.

As noted, PS 202 can include hardware processor resources such as one or more different types of I/O devices or interfaces. PS 202 can provide flash memory type I/O devices, higher performance I/O devices, lower performance interfaces, debugging I/O devices, and/or RAM I/O devices. The RAM I/O devices, i.e., memory controller 228, have been described within this specification.

Regarding additional types of I/O devices, PS 202 can include one or more flash memory interfaces 240 illustrated as 240A and 240B. For example, one or more of flash memory interfaces 240 can be implemented as a Quad-Serial Peripheral Interface (QSPI) configured for 4-bit communication. One or more of flash memory interfaces 240 can be implemented as a parallel 8-bit NOR/SRAM type of interface. One or more of flash memory interfaces 240 can be implemented as a NAND interface configured for 8-bit and/or or 16-bit communication. It should be appreciated that the particular interfaces described are provided for purposes of illustration and not limitation. Other interfaces having different bit widths can be used.

PS 202 can include one or more of I/O devices 242 providing a higher level of performance than I/O devices 240. Each of I/O devices 242A-242C can be coupled to a DMA controller 244A-244C respectively. For example, one or more of I/O devices 242 can be implemented as a Universal Serial Bus (USB) type of interface. One or more of I/O devices 242 can be implemented as a gigabit Ethernet type of interface. One or more of I/O devices 242 can be implemented as a Secure Digital (SD) type of interface.

PS 202 can include one or more I/O devices 246 such as I/O devices 246A-246D that provide a lower level of performance than I/O devices 242. For example, one or more of I/O devices 246 can be implemented as a General Purpose I/O (GPIO) type of interface. One or more of I/O devices 246 can be implemented as a Universal Asynchronous Receiver/Transmitter (UART) type of interface. One or more of I/O devices 246 can be implemented in the form of a Serial Peripheral Interface (SPI) bus type of interface. One or more of I/O devices 246 can be implemented in the form of a Controller-Area-Network (CAN) type of interface and/or an $I^2C$ type of interface. One or more of I/O devices 246 also can be implemented in the form of a Triple Timer Counter (TTC) and/or a Watchdog Timer (WDT) type of interface.

PS 202 can include one or more debug I/O devices 248 such as processor JTAG (PJTAG) port or interface 248A and a trace interface 248B. PJTAG port 248A can provide an external debug interface for PS 202. Trace interface 248B can provide a port to receive debug, e.g., trace, information from programmable circuitry 204, a port to send debugging data of PS 202 out to programmable circuitry 204, and a cross trigger port. The cross trigger port allows circuitry within programmable circuitry 204 to trigger debug functions such as trace within PS 202. Similarly, PS 202 can initiate debug functions within circuits implemented within programmable circuitry 204.

As shown, each of I/O devices 240, 242, 246, and 248 can be coupled to a multiplexer 250. Multiplexer 250 provides a plurality of outputs that can be directly routed or coupled to external pins of IC 200, e.g., balls of the package within which IC 200 is disposed. For example, a plurality of I/O pins of IC 200, e.g., 53 pins, can be shared among interfaces 240, 242, 246, and 248. A user can configure multiplexer 250, as part of PS 202, to select which of interfaces 240-248 are to be used and, therefore, coupled to I/O pins of IC 200 via multiplexer 250.

As shown, signals that couple I/O devices 242-248 to multiplexer 250 also can be coupled to a fabric multiplexer input/output (FMIO) interface 252. Accordingly, based upon user configuration of IC 200 and, more particularly, PS 202, any one of I/O devices 242, 246, and/or 248 can be coupled to programmable circuitry 204 of IC 200 via FMIO interface 252. FMIO interface 252, for example, can include a configurable switch for each signal line coupled thereto allowing the signal line to be selectively coupled to programmable circuitry 204 depending upon the state of that switch. FMIO interface 252, and the switches included therein, can be configured as part of PS 202, e.g., via control register 254, to determine which signals pass from I/O devices 242-248 to programmable fabric 204. This allows data being communicated from any one of interfaces 242-248 to be routed to circuitry within programmable circuitry 204 for further processing and/or monitoring. Data received via one or more of the I/O pins coupled to I/O devices 242, 246, and 248 can be routed to programmable circuitry 204 for further processing through one or more of interfaces 256.

FMIO interface 252 allows data that is output from I/O devices 242, 246, and 248 to be provided to one or more of the I/O pins, to selected circuits implemented within programmable circuitry 204, e.g., user circuitry 280, or to both one or more I/O pins concurrently with selected circuits implemented within programmable circuitry 204. It should be appreciated that to couple to FMIO interface 252, circuits implemented within programmable circuitry 204 must be configured to do so through the loading of configuration data to form or implement the physical circuitry.

In an embodiment, each of I/O devices 240, 242, 246, and 248 can be configured to generate an interrupt signal illustrated as signal 290. For example, each of I/O devices 240A-240B, 242A-242C, 246A-246D, and 248A-248B can be configured to generate an interrupt on signal 290. As shown, signal 290 couples to IRQ 216 of core complex 206 and is also coupled directly to programmable circuitry 204. Interrupt signal 290, being located within PS 202, is hard-wired, e.g., fixed wiring. Accordingly, interrupts generated by any of I/O devices 240-248 can be provided to core complex 206 and/or to programmable circuitry 204 thereby facilitating use of I/O devices 240-248 by either programmable circuitry 204 and/or core complex 206. An interrupt from each of I/O devices 240-248, for example, can be provided concurrently to IRQ 216 and to programmable circuitry 204.

Control register 254 can be configured to control various, if not most, aspects of PS 202. One or more commands can be written to control register 254 to control or regulate operation of PS 202. For example, circuits within programmable circuitry 204 can write to control register 254 through an interface such as interface 256B, to be described herein in further detail. Control register 254 can control or regulate functions such as controlling intellectual property (IP) enable resets, setting clock frequencies generated by clock unit 226, specifying I/O drive strength, the state of FMIO interface 252 in terms of which signals are routed through to programmable circuitry 204, and other system level functions. Control register 254 can regulate additional functions such as powering down PS 202, powering down or deactivating particular interfaces of PS 202 independently, or the like. Control register 254 can be accessed through a bus such as, for example, an APB (not shown), that couples control register 254 to core switch 236.

PS 202 also can include one or more interfaces 256, depicted as interfaces 256A-256D, that couple directly with programmable circuitry 204. In an embodiment, one or more or all of interfaces 256 can be implemented in accordance with the AMBA AXI Protocol Specification (AXI) as published by ARM. For example, each of interfaces 256 can be implemented in conformance with the AMBA AXI Protocol Specification v. 3.0, which is incorporated herein by reference in its entirety. In general, AXI is a high performance, high frequency interface that is suitable for submicron interconnect.

Referring again to FIG. 2, interfaces 256A and 256B, for example, each can be implemented to provide two, 32-bit channels that couple programmable circuitry 204 with core switch 236. Interface 256A can be implemented as a general-purpose master interface. Interface 256A, for example, can be used to perform general purpose transfers of data from PS 202 and/or a DMA controller therein, to programmable circuitry 204. Interface 256B can be implemented as a general-purpose slave interface. For example, interface 256B can be used to perform general purpose data transfer between PS 202 and programmable circuitry 204.

Through interfaces 256A-256B and core switch 236, circuits implemented within programmable circuitry 204 can access various ones of I/O devices 240, 242, 246, and 248. Through interfaces 256A and/or 256B, in combination with core switch 236, circuits within programmable circuitry 204 further can access OCM 222 directly and off-chip memory through memory controller 228, etc.

Interface 256C can be implemented as a 64-bit slave interface that couples programmable circuitry 204 directly with core complex 206 and, more particularly, SCU 218. Through interface 256C and SCU 218, circuits implemented within programmable circuitry 204 are provided with direct access to the L1 cache within each of cores 208 and 210, IRQ 216, L2 cache 220, and OCM 222. Accordingly, circuits within programmable circuitry 204 can read and/or write to such memories and detect interrupts generated or asserted within core complex 206. For example, interface 256C can provide coherent access to core complex 206 that is suitable for use by circuits functioning as co-processors. In illustration, a soft processor implemented within programmable circuitry 204 in the form of user circuitry 280 can communicate with PS 202 via interface 256C.

Programmable circuitry 204 is configurable to directly detect interrupts from I/O devices 240, 242, 246, and 248, or to detect interrupts from IRQ 216. It should be appreciated that IRQ 216 allows programmable circuitry 204 to detect processor-specific or processor-generated interrupts that originate within core complex 206. Signal 290 further can represent one or more interrupts from programmable circuitry 204 that can be provided to IRQ 216 as ports or signals and/or one or more copies of interrupts from PS 202, and in particular from core complex 206, that can be provided to programmable circuitry 204 as ports or signals.

Interface 256D can be implemented to provide a plurality, e.g., four, 64-bit slave interfaces. Interface 256D can be used to exchange large amounts of data between PS 202 and circuits implemented within programmable circuitry 204 efficiently. As shown, interface 256D provides circuits implemented within programmable circuitry 204 with access to OCM 222 via memory switch 238 and access to off-chip memory via memory switch 238 and memory controller 228.

In addition, PS 202 can include a PS voltage detector 292. PS voltage detector 292 can monitor incoming voltage sources from a power supply depicted as signal 294. Responsive to determining that the voltage of signal 294 meets a predetermined voltage level, PS voltage detector 292 can enable one or more other components by issuing control signals (not shown). For example, responsive to determining that the voltage of signal 294 is at least a minimum voltage level, PS voltage detector 292 can enable one or more IOBs of IC 200. In another example, responsive to determining that the voltage of signal 294 meets a minimum voltage level, PS voltage detector 292 can enable one or more level shifters collectively shown as level shifting circuitry 296. Further functionality of PS voltage detector 292 will be described with reference to the remaining figures.

IC 200 can include level shifting circuitry 296 to facilitate transfer of signals between PS 202 and programmable circuitry 204. Level shifting circuitry 296 helps to electrically isolate PS 202 from programmable circuitry 204 and is configured to convert signals at a first voltage level to signals at a second voltage level. In some cases, the first and second voltage levels can be different voltage values. For example, in some cases, PS 202 can operate using a power signal having a different voltage potential than the power signal provided to programmable circuitry 204. In other cases, PS 202 can receive one or more power signals that have, or are intended to have, a same voltage potential as power signals provided to programmable circuitry 204. The power signals, however, can be independently controlled, resulting in two different power domains despite the similarity or sameness of the voltage potentials of the power signals. The independence of the power signals can cause small variations in the voltage potential of the power signals provided to PS 202 as compared to the power signals provided to programmable circuitry 204. Level shifting circuitry 296 allows PS 202 to function as one power domain and programmable circuitry 204 to function as a different and independent power domain, thereby allowing programmable circuitry 204 to be powered on and power off independently of PS 202, e.g., while PS 202 remains powered on and operational.

To account for the potential variations in the power signals and also to support the ability to power cycle programmable circuitry 204 independently of PS 202, signals crossing between PS 202 and programmable circuitry 204 can be passed through level shifting circuitry 296. Though illustrated as a single block, it should be appreciated that each of the various interfaces described, e.g., FMIO interface 252, trace interface 248B, interfaces 256A-256D, processor configuration access port (PCAP) 258, and any other signals such as clock signals and DMA signals, can include, or pass through, level shifters represented by level shifting circuitry 296. Level shifting circuitry 296 ensures that voltage levels for signals that propagate between PS 202 and programmable circuitry 204 are matched.

IC 200 can include one or more different classes of level shifters within level shifting circuitry 296. For example, a first class of level shifters can be configured to connect signals, e.g., system level signals such as configuration signals, boundary scan signals and/or functions, directly from PS 202 to components within programmable circuitry 204 such as system monitor 262 to be described herein in greater detail. Level shifters belonging to the first class of level shifting circuitry 296 can be enabled when PS 202 is out of reset, e.g., enters an operational mode, and the power to programmable circuitry 204 has been determined to be adequate for operation. Adequate power for operation of programmable circuitry 204 can include sufficient power for configuration of programmable circuitry 204 to occur and/or sufficient power for any circuits implemented within programmable circuitry 204 to function once implemented.

A second class of level shifters can be configured to connect test signals from programmable circuitry 204 to PS 202. The second class of level shifters can be enabled when PS 202 is out of reset and programmable circuitry 204 has both adequate power and is also configured to implement circuitry. When disabled, the second class of level shifters can be configured to output a default logic high. In another embodiment, the second class of level shifters, when disabled, can be configured to output a default logic low.

A third class of level shifters can be configured or available to connect user signals between PS 202 and programmable circuitry 204. The third class of level shifter can be enabled when PS 202 is out of reset and programmable circuitry 204 has both adequate power and is configured. In an embodiment, the third class of level shifters, when disabled, can be configured to output a default logic low. In another embodiment, the third class of level shifters, when disabled, can be configured to output a default logic high.

A fourth class of level shifter can be configured to convey one or more system level signals between programmable circuitry 204 and PS 202. The fourth class of level shifters can be configured to be enabled, e.g., operational, at all times.

PS 202 further includes PCAP 258. As shown, PCAP 258 can be coupled to a configuration controller 260 and a system monitor block 262, both located within programmable circuitry 204. Though not shown, PCAP 258 can be coupled core switch 236 allowing PS 202 to receive configuration data via any of the I/O devices 240-248 and 228, for use in configuring programmable circuitry 204.

Programmable circuitry 204 can be implemented to include one or more programmable circuit blocks that can be coupled together using programmable interconnect circuitry. The programmable circuit blocks and the programmable interconnect circuitry can be configured to implement one or more different physical circuits, e.g., user circuitry 280, based upon configuration data loaded into IC 200. It should be appreciated that programmable circuitry 204, with the exception of various hard-wired circuits implemented therein and to be described herein in further detail, is not operational or functional until configuration data is loaded within configuration memory causing physical circuitry to be implemented within programmable circuitry 204. As noted, the configuration data that is loaded specifies connectivity of user circuitry 280 to one or more signals of FMIO interface 252, interrupts 290, interfaces 256, and the like.

Configuration controller 260 and system monitor block 262 can be implemented in the form of hard-wired circuitry. Configuration controller 260 is responsible for writing configuration data to configuration memory cells thereby physically implementing circuitry specified by the configuration data within programmable circuitry 204. System monitor block 262 can perform functions such as analog-to-digital conversion, voltage monitoring, current monitoring, and/or temperature monitoring.

As noted, programmable circuitry 204 also can be configured to implement one or more I/O devices in the form of hard-wired circuits. For example, a JTAG interface 264, one or more MGTs 266A-266D, a Peripheral Component Interconnect Express (PCIe) interface 268, an Internal Configuration Access Port (ICAP) 270, and a security port 272 can be included as hard-wired circuits despite being located within programmable circuitry 204 of IC 200. The various I/O devices within programmable circuitry 204 illustrate exemplary interfaces that can be implemented and are not intended to be restrictive or limiting as to the one or more embodiments disclosed within this specification.

For example, configuration data can be loaded into IC 200 and received by a configuration controller 260. In an embodiment, configuration data can be received through PS 202, which can control the configuration process of IC 200. Configuration controller 260 can load the configuration data received from PS 202 via PCAP 258 within configuration memory (not shown) of IC 200. Different physical circuits such as user circuitry 280 can be implemented or formed within programmable circuitry 204 as specified by the particular configuration data loaded into the configuration memory of IC 200. It should be appreciated that the loading of configuration data in this manner, due to the use of hard-wired circuitry, requires no initial configuration of programmable circuitry 204. Circuits implemented within programmable circuitry 204, in consequence of loading configuration data, though physical circuits, typically are referred to as "soft" in that the circuitry is formed within programmable circuitry 204 rather than being hard-wired or otherwise fixed within IC 200, which is to be distinguished from PS 202.

The IC architecture illustrated in FIG. 2 facilitates cooperative usage of programmable circuitry 204 and PS 202 together in a variety of different forms that are otherwise unattainable. User circuitry 280 can be coupled to PS 202 through any of the various interfaces described. Direct access can be provided via interfaces 256, while further access to PS 202 can be facilitated through FMIO interface 252. In one example, programmable circuitry 204 can couple to one or more external processing nodes, e.g., processing nodes not located on IC 200, having defined interfaces. Programmable circuitry 204 can access the external processing nodes through, for example, I/O pins reserved for use by programmable circuitry 204. Programmable circuitry 204 also can access one or more I/O devices such as I/O devices 240-248 and/or memory controller 228 via the interfaces 256.

In another example, PS 202 can be configured to provide "standard I/O" functions to circuits implemented within programmable circuitry 204. PS 202, for example, can be configured to load and execute a library of standard input (stdin), standard output (stdout), and/or standard error (stderr) functions to be made available as part of the operating system executing within core complex 206. User circuitry 280, as implemented within programmable circuitry 204, can be configured to invoke or access the standard I/O functions provided by core complex 206 via one or more of the interfaces 256. By allowing circuitry, e.g., a soft processor, within programmable circuitry 204 to access standard I/O functions from PS 202, the overhead typically incurred from implementing standard I/O functions within programmable circuitry 204 can be overcome by keeping standard I/O implementation within PS 202. This allows less complex and streamlined controllers to be implemented within programmable circuitry 204 than would otherwise be the case.

Figure 3:
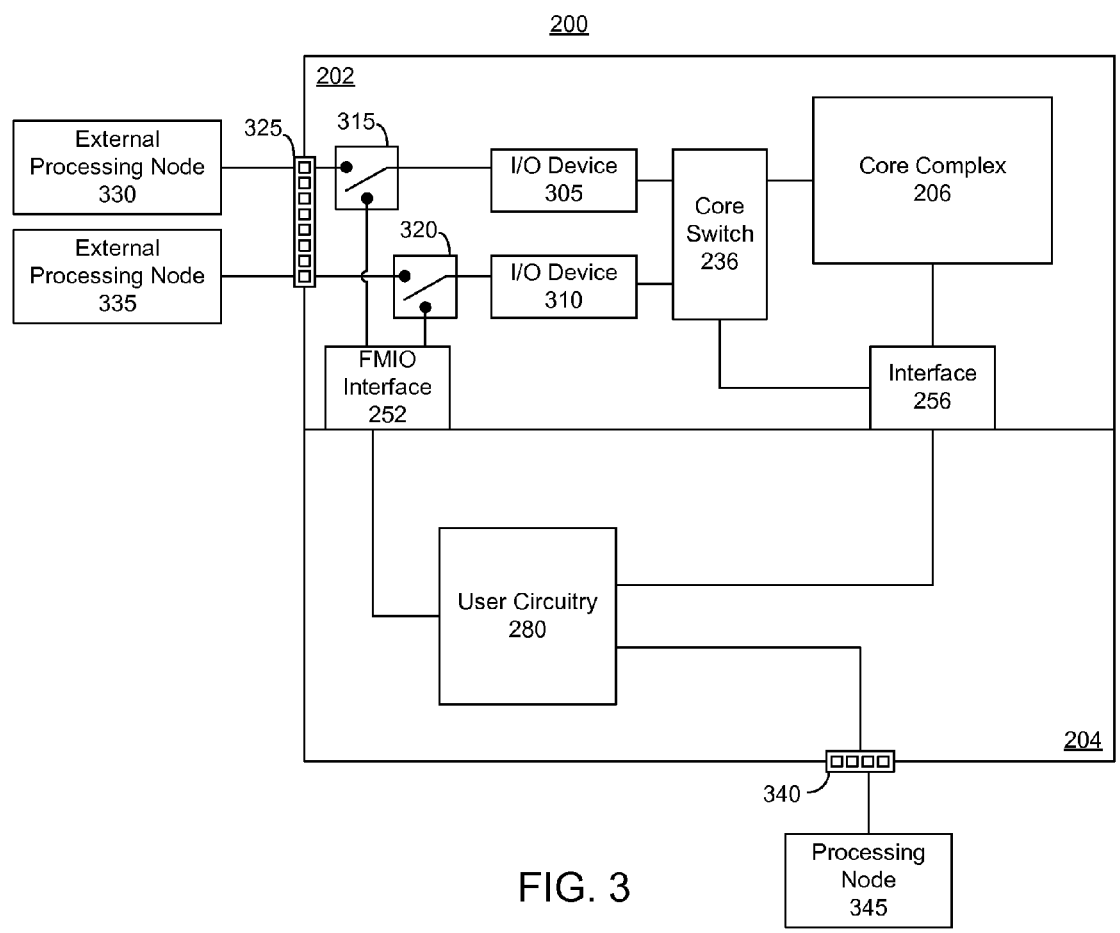
FIG. 3 is a third block diagram illustrating the IC of FIG. 2 in accordance with another embodiment disclosed within this specification.

FIG. 3 is a third block diagram illustrating IC 200 of FIG. 2 in accordance with another embodiment disclosed within this specification. FIG. 3 illustrates an abstracted view of IC 200 depicting operation of selected processor hardware resources. Within FIG. 3, I/O devices 305 and 310 are intended to represent any two of I/O devices 242-248, e.g., 242A-242C, 246A-246D, and/or 248A-248B. Further, for purposes of illustration, I/O devices 305 and 310 are shown to couple with core complex 206 via core switch 236. Various memories of PS 202 through which devices exchange data, e.g., L2 cache 220 and OCM 222, are not shown. Similarly, interface 256 is illustrated as a general representation of the various interfaces described with reference to FIG. 2. For example, interface 256 can represent any one or more of interfaces 256A-256D.

As shown, PS 202 can include a plurality of switches 315 and 320 that can selectively couple signals from I/O devices 305 and 310 to either I/O pins 325 or to FMIO interface 252. Though not shown, it should be appreciated that each wire that couples an I/O device (I/O devices 242-248) of PS 202 with multiplexer 250 can be switchable as illustrated in FIG. 3. In an embodiment, configuration data provided to PS 202, e.g., data loaded into control register 254 of FIG. 2, can determine whether I/O device 305 and/or I/O device 310 is coupled to I/O pins 325 or to FMIO interface 252. It should be appreciated that each of the I/O devices 242-248 can be independently configured to couple to I/O pins 325 or to FMIO interface 252.

Switches 315 and 320 can be implemented as any of a variety of known switching circuits, e.g., multiplexers or the like. When switch 315 couples I/O device 305 to I/O pins 325, I/O device 305 can be coupled to external processing node 330. In the example shown in FIG. 3, I/O pins 325 can be dedicated solely for use by PS 202. In this regard, I/O pins 325 are coupled to multiplexer 250 (not shown) and are not available for use by programmable circuitry 204 or, for example, user circuitry 280. When switch 315 decouples I/O device 305 from I/O pins 325, I/O device 305 is coupled to FMIO interface 252 and, for example, programmable circuitry 204 and selected circuits implemented within programmable circuitry 204, e.g., user circuitry 280.

Similarly, when switch 320 couples I/O device 310 to I/O pins 325, I/O device 310 can be coupled to external processing node 335. When switch 320 decouples I/O device 310 from I/O pins 325, I/O device 310 is coupled to FMIO interface 252 and, for example, programmable circuitry 204 and selected circuits implemented within programmable circuitry 204, e.g., user circuitry 280. In another embodiment, when data is provided to external processing nodes 330 and 335, data can be regenerated through switches 315 and 320 to be provided concurrently to user circuitry 280 via FMIO interface 252.

Switches 315 and 320 can operate independently of one another. Accordingly, I/O device 305 can be coupled to I/O pins 325 while I/O device 310 is coupled to FMIO interface 252. Similarly, I/O device 305 can be coupled to FMIO interface 252 while I/O device 310 is coupled to I/O pins 325. In other examples, both I/O devices 305 and 310 can be coupled to I/O pins 325 or both can be coupled to FMIO interface 252.

External processing nodes 330 and 335 can be any of a variety of systems, circuits, or computing systems configured to communicate using a particular interface. For example, external processing nodes 330 and/or 335 can implement an I²C type of interface, a CAN interface, a serial peripheral interface (SPI), or the like. The interface of external processing nodes 330 and/or 335 can be coupled to pins 325. As noted, pins 325 can be coupled to one or more of I/O devices 305 and 310 via multiplexer 250.

Through proper configuration of PS 202, user circuitry 280 that is instantiated within programmable circuitry 204 can be coupled to one or both of I/O devices 305 and 310 through FMIO interface 252. In this manner, user circuitry 280 can be used cooperatively with I/O devices 305 and/or 310 without having to couple external I/O pins of IC 200, e.g., circuit board level traces or the like, to route data between I/O pins dedicated to PS 202 with I/O pins dedicated to programmable circuitry 204.

In an embodiment, user circuitry 280 can be coupled to FMIO interface 252. For example, switch 315 can be in a state that couples I/O device 305 to FMIO interface 252. User circuitry 280 can be coupled to I/O device 305 via FMIO interface 252 or through interface 256 by way of core switch 236. Accordingly, data that is input and/or output from I/O device 305 can be routed through, and processed by, user circuitry 280. User circuitry 280 further can be coupled to I/O pins 340. I/O pins 340 can be dedicated for use by programmable circuitry 204 and, as such, are not available for use by PS 202. For example, data can be received via I/O pins 340, processed within user circuitry 280, and provided to I/O device 305. Similarly, data received from I/O device 305 can be processed by user circuitry 280 and output to I/O pins 340.

Processing data, for example, as performed by user circuitry 280, can refer to modifying received data and outputting the modified data or evaluating received data for particular characteristics and outputting an indication signal that particular characteristics are present within the received data. In the case of monitoring received data, the received data also can be output in addition to any indication signals from user circuitry 280.

In one example, user circuitry 280 can be configured to convert data that is received from I/O device 305 via FMIO interface 252 from a first format or protocol to a second format or protocol. The data that is received can be formatted according to a first protocol, processed by user circuitry 280, and output as processed data in a second and different protocol. The processed data can be output from pins 340.

In another example, data that is received within user circuitry 280 can be modified through augmentation. For instance, user circuitry 280 can be configured to add timing information, e.g., a time stamp, to data received via I/O pins 340 from a processing node 345 coupled thereto. Ethernet packets received from processing node 345, for example, can be augmented with a time stamp and output as processed data from user circuitry 280. User circuitry 280 can output the data to I/O device 305 via FMIO interface 252 and switch 315. In another example, user circuitry 280 can output processed data to PS 202 via interface 256 and provide the data to I/O device 305 by way of core switch 236.

In another example, data received by user circuitry 280 can be processed, e.g., evaluated, for particular predetermined characteristics within the received data. Responsive to detecting the predetermined characteristics, user circuitry 280 can generate a notification signal that can be output and provided to I/O pins 340 or interface 256. User circuitry further can be configured to output the notification signal through FMIO interface 252 to one or both of I/O devices 305 or 310 coupled to FMIO interface 252 via respective switches 315 and/or 320 respectively.

Figure 4:
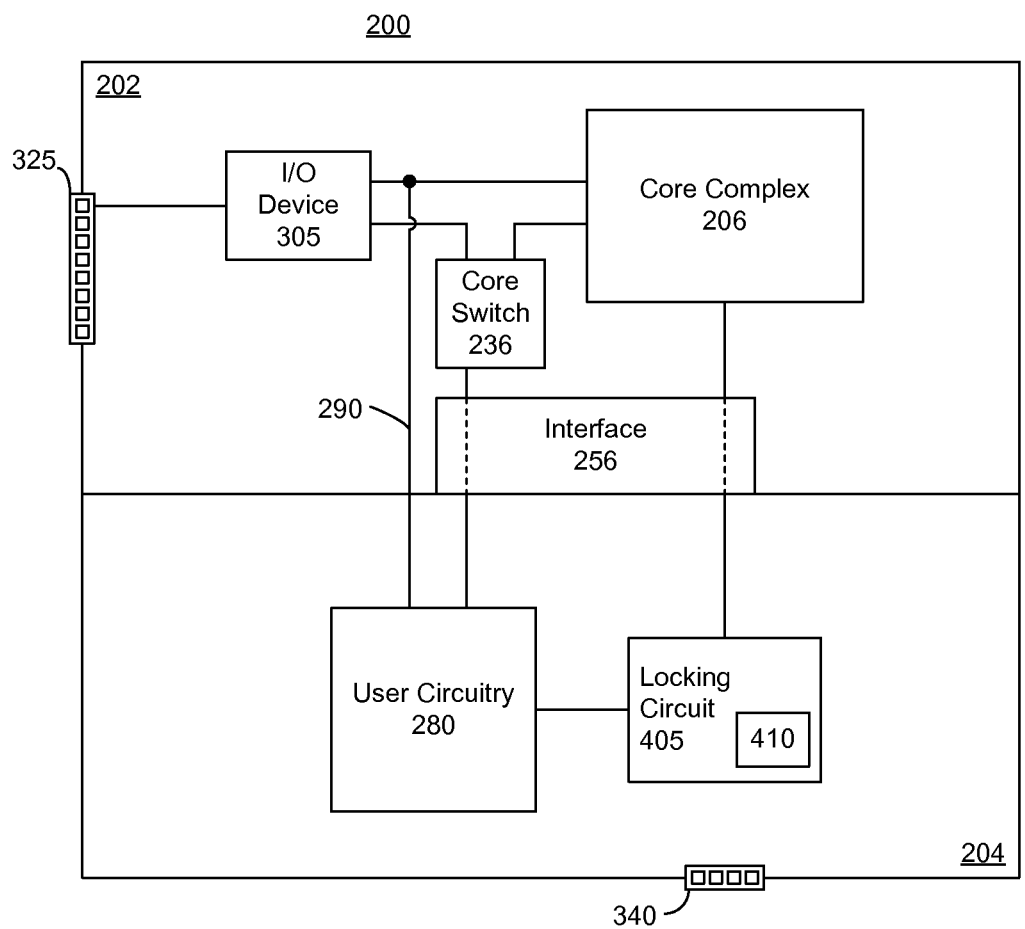
FIG. 4 is a fourth block diagram illustrating the IC of FIG. 2 in accordance with another embodiment disclosed within this specification.

FIG. 4 is a fourth block diagram illustrating IC 200 of FIG. 2 in accordance with another embodiment disclosed within this specification. FIG. 4 illustrates an abstracted view of IC 200 to illustrate the sharing of processor hardware resources such as I/O device 305 of PS 202 with circuitry such as user circuitry 280 implemented within programmable circuitry 204. As noted with respect to FIG. 3, one or more components within IC 200 are not shown for clarity and ease of illustration. For example, FMIO interface 252, switches 315 and 320, and various other components within programmable circuitry 204 are not shown in FIG. 4.

In the example shown in FIG. 4, I/O device 305 can represent any one of I/O devices 240, 242, 246, and/or 248. In general, sharing I/O device 305 between PS 202 and programmable circuitry 204 requires use of a locking mechanism to indicate when I/O device 305 is available and, further, to indicate when I/O device 305 is not available. FIG. 4 illustrates an example in which a hardware locking mechanism is implemented within programmable circuitry 204. When user circuitry 280 is granted control over I/O device 305, user circuitry 280 can access I/O device 305 through interface 256 in combination with core switch 236. When core complex 206, or a process executing therein, is granted control over I/O device 305, core complex 206 can communicate via one or more memories (not shown) in combination with core switch 236.

Locking circuit 405, as shown, can be implemented within programmable circuitry 204. Locking circuit 405 can have a defined interface through which user circuitry 280 and PS 202 can communicate. Core complex 206, for example, can communicate with locking circuit 405 via interface 256. Appropriate signal links can be established within programmable circuitry 204 to couple interface 256 with locking mechanism 405. I/O device 305, which is to be shared among programmable circuitry 204 and PS 202, can be associated with a particular register, e.g., register 410, that is located within locking circuit 405. Locking circuit 405 can implement exclusive access so that only one entity, e.g., a particular circuit within programmable circuitry 204, a particular thread or process executing within core complex 206, etc., can be granted access or use of I/O device 305. Exclusive access also can be referred to as "load store exclusive" functionality.

In illustration, consider the case in which an Ethernet, UART, etc. type of I/O device 305 is to be shared between core complex 206 and user circuitry 280. Locking circuit 405 can include register 410 that is dedicated to tracking the state, e.g., ownership or control, of I/O device 305 to be shared. The value stored in register 410, for example, can indicate whether I/O device 305 is available or busy. In an embodiment, an identifier associated with and/or uniquely identifying the entity to which control over I/O device 305 is granted can be stored within register 410 also. Accordingly, any time that control over I/O device 305 is needed by user circuitry 280 or core complex 206, the entity that desires control must request control of I/O device 305 from locking circuit 405.

When control is requested and I/O device 305 is available, locking circuit 405 can respond to the requesting entity by granting control over I/O device 305 to the requesting entity. Locking circuit 405, for example, can return a value or signal indicating to the requesting entity that the requesting entity has received control over I/O device 305. Further, locking circuit 405, automatically and responsive to the requesting entity, can store a value within register 410, which is associated with I/O device 305, indicating that I/O device 305 is no longer available. As noted, an identifier specifying the entity to which control is granted can be stored within register 410 also. Accordingly, when two entitites request the same resource, e.g., same processor hardware resource, e.g., I/O device 305, simultaneously, only one requesting entity is grated access to the requested resource.

When locking circuit 405 receives further requests for control over I/O device 305 from other entities, whether located within PS 202 or programmable circuitry 204, and register 410 for I/O device 305 indicates that I/O device 305 is not available, locking circuit 405 responds with an error or other indication that I/O device 405 is not available. When an entity that has control over I/O device 305 no longer requires control, that entity can notify locking circuit 405. In response, locking circuit 405 can store a value within register 410 indicating that I/O device 305 is available, thereby releasing I/O device 305 from the control of the requesting entity. Further, any identifier for an entity also stored within register 410 can be cleared or erased.

As shown, interrupt signals are conveyed via signal 290 from I/O device 305 to programmable circuitry 204 and to core complex 206. I/O device 305 can be configured to trigger interrupts via signal 290 responsive to various events depending upon the particular type of I/O device 305 and the transaction or operation being performed. As noted, I/O device 305 can be coupled to a hard-wired interrupt signal, denoted as signal 290, that can be provided to core complex 206 and to programmable circuitry 204. Examples of events that can cause an I/O device to generate an interrupt can include receiving data from an external processing node with which I/O device 305 is communicating, a request from I/O device 305 to an external processing node timing out, etc.

Responsive to I/O device 305 generating an interrupt on signal 290, the particular entity that has control over I/O device 305 at that time can respond as may be required. For example, when user circuitry 280 has control over I/O device 305, user circuitry 280 can service the interrupt. Core complex 206, e.g., any processes executing therein, can ignore the interrupt. Similarly, when a process executing within core complex 206 has control over I/O device 305, that process or another can services the interrupt. User circuitry 280 can ignore the interrupt.

FIG. 4 illustrates a case in which an I/O device of PS 202 is shared with circuitry implemented within programmable circuitry 204. In another embodiment, programmable fabric 204, e.g., user circuitry 280, can be given exclusive control over I/O device 305. In that case, where programmable circuitry 204 has exclusive control over I/O device 305, no locking mechanism is required. PS 202 does not attempt to gain control over I/O device 305, unless for example, programmable circuitry 204 is to be powered off.

Figure 5:
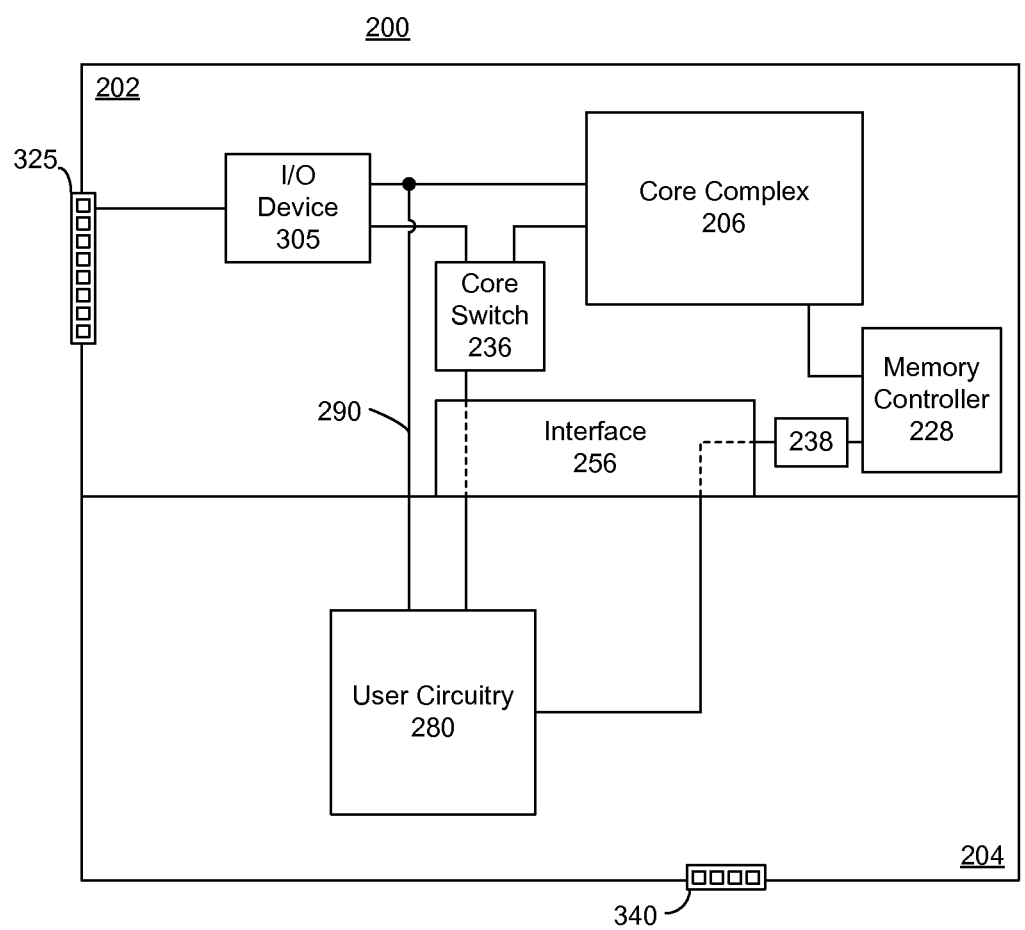
FIG. 5 is a fifth block diagram illustrating the IC of FIG. 2 in accordance with another embodiment disclosed within this specification.

FIG. 5 is a fifth block diagram illustrating IC 200 of FIG. 2 in accordance with another embodiment disclosed within this specification. FIG. 5 illustrates an abstracted view of IC 200 to illustrate sharing of a processor hardware resource shown as I/O device 305 of PS 202 with circuitry such as user circuitry 280 implemented within programmable circuitry 204. One or more components within IC 200 are not shown for clarity and ease of illustration. For example, FMIO interface 252, switches 315 and 320, and various other components within programmable circuitry 204 are not shown in FIG. 5.

FIG. 5 illustrates an example of a hardware locking mechanism in which memory controller 228 can be utilized as the locking mechanism for granting control over I/O device 305. Memory controller 228 further can function as a locking mechanism for determining which entity can access memory that is external to IC 200 that is coupled to IC 200 via memory controller 228, e.g., an externally located RAM device.

Memory controller 228, for example, can be configured to implement load store exclusive functions. Rather than utilizing a register located in programmable circuitry 204, as was the case with the locking circuit of FIG. 4, memory controller 228 can utilize a memory location within the memory located external to IC 200 for each I/O device, including memory controller 228 itself, which can be shared between PS 202 and programmable circuitry 204. Thus, rather than issue requests to a locking circuit located within programmable circuitry 204, user circuitry 280 and core complex 206 can direct requests for control over processor hardware resources such as I/O device 305 and/or memory controller 228 to memory controller 228.

Requesting entities such as user circuitry 280 and core complex 206 can request control over I/O device 305 substantially as described with reference to FIG. 4. Requests for control and notifications of the release of control, however, can be directed to memory controller 228. As noted, in an embodiment, RAM located external to IC 200 to which memory controller 228 is coupled also can be shared between PS 202 and programmable circuitry 204. Accordingly, requests for control still can be directed to memory controller 228. As noted, when programmable circuitry 204 is given exclusive access to I/O device 305 or memory controller 228, for example, no locking mechanism need be utilized since control does not change back and forth between PS 202 and programmable circuitry 204 dynamically during operation of IC 200.

In another embodiment, core complex 206 can be tasked with locking I/O devices that are allocated to particular requesting entities. As noted, one of interfaces 256, e.g., 256C, can provide circuitry such as user circuitry 280 with coherent access to core complex 206. Through interface 256C, user circuitry 280 can see the internal cache, e.g., L1 cache, L2 cache 220, and OCM 222, of PS 202. By using interface 256C that provides coherency, programmable circuitry 204 and, more particularly user circuitry 280, can utilize load store exclusive functions of core complex 206 that are built in and provide another form of a hardware locking mechanism that can be used for sharing of I/O device 305, inclusive of I/O device 240, and/or memory controller 228. For example, memory locations within L1 cache and/or L2 cache 220 can be used to track availability of I/O devices, whether I/O device 305 and/or memory controller 228.

Figure 6:
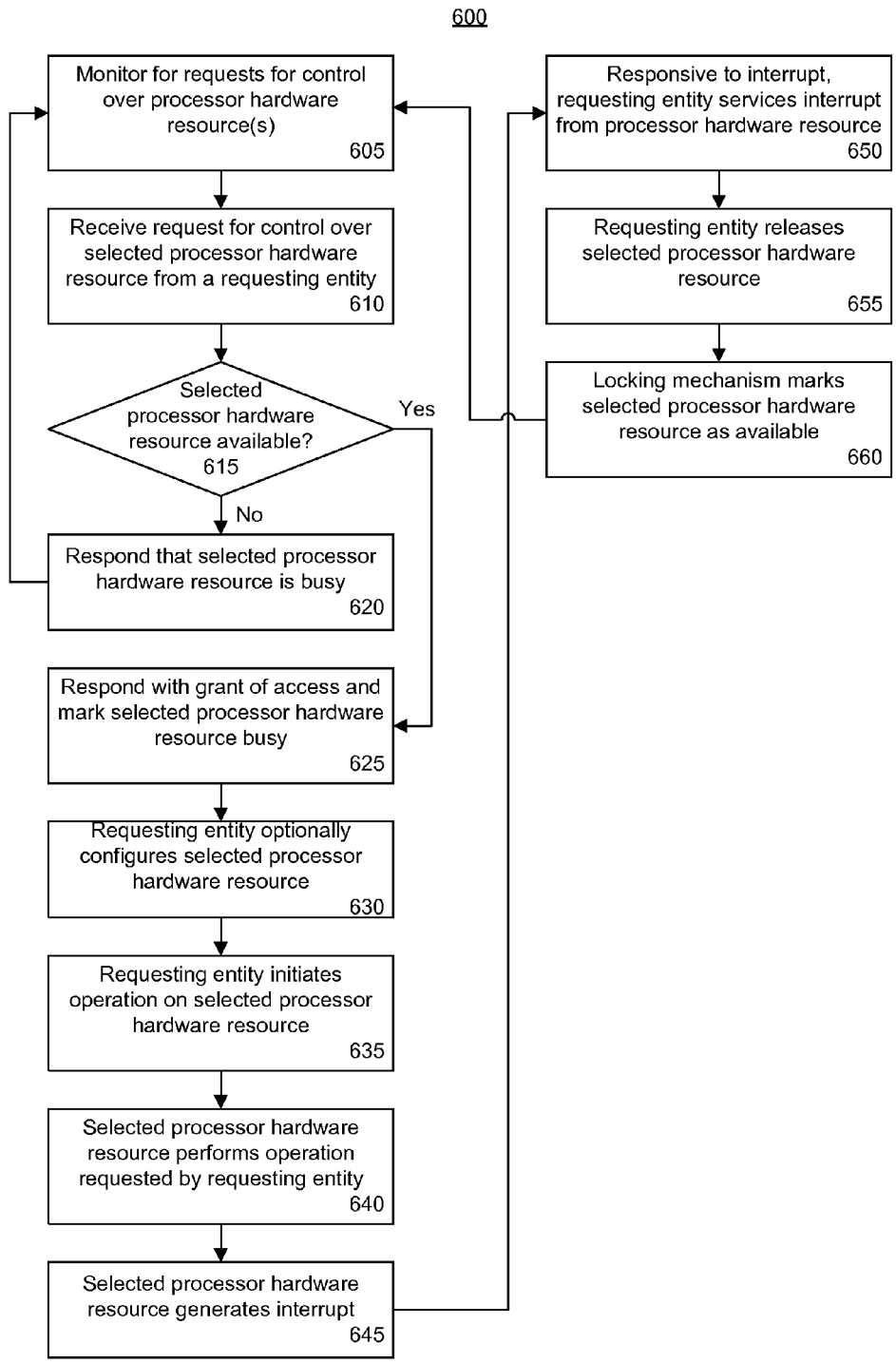
FIG. 6 is a first flow chart illustrating a method of sharing a processor hardware resource in accordance with an embodiment disclosed within this specification.

FIG. 6 is a first flow chart illustrating a method 600 of sharing an I/O device in accordance with an embodiment disclosed within this specification. More particularly, method 600 illustrates an embodiment in which coarse-grained sharing of an I/O device can be facilitated. Method 600 can be implemented by an IC as described within this specification, e.g., one that includes a PS coupled to a programmable circuitry.

Method 600 illustrates an embodiment in which one or more user circuits implemented within the programmable circuitry are configured to share a processor hardware resource of the PS with one or more processes executing within the core complex of the PS. For example, within the programmable circuitry, a soft processor such as a MicroBlaze™ soft processor available from Xilinx, Inc. of San Jose, Calif., can be implemented, e.g., as user circuitry 280. The soft processor can be coupled to a hardware locking mechanism, whether implemented within the programmable circuitry, implemented by the core complex with the soft processor being coupled via an interface providing coherent access, or implemented by the memory controller.

The processor hardware resource can be any of those described with reference to I/O devices 240-248 and/or memory controller 228 of the PS. For example, the processor hardware resource being shared can be a flash type of interface, e.g., a QSPI, a parallel NOR/SRAM type of interface, a NAND interface, or the like. In another example, the processor hardware resource being shared can be a USB type of interface, an Ethernet type of interface, an SD type of interface, a UART type of interface, or the like. Any of the various I/O device types described with reference to I/O devices 240-248 of FIG. 2 can be shared. Moreover, memory controller 228 can be shared facilitating sharing of RAM located off chip between the PS and the programmable circuitry.

Accordingly, method 600 can begin in step 605 where the locking mechanism can monitor for requests for control over processor hardware resources of the PS from various entities. The entities that can issue requests can include circuits implemented within the programmable circuitry, e.g., user circuitry 280 and/or a soft processor, or a process executing within the core complex of the PS. In step 610, the locking mechanism can receive a request for access to a selected processor hardware resource from a requesting entity.

In step 615, the locking mechanism can determine whether the selected processor hardware resource is available. Responsive to determining that the selected processor hardware resource is not available, e.g., is busy, method 600 can proceed to step 620. In step 620, the locking mechanism can respond to the requesting entity indicating that the selected processor hardware resource is busy and, therefore, not available. After step 620, method 600 can loop back to step 605 to continue monitoring for further requests for control over processor hardware resources of the PS.

Responsive to determining that the selected I/O device is available, method 600 can continue to step 625. In step 625, responsive to the locking mechanism determining that the selected processor hardware resource is available, the locking mechanism can respond to the requesting entity with a grant of control. The locking mechanism can notify the requesting entity that the selected processor hardware resource is available and control over the selected processor hardware resource has been granted to the requesting entity. Further, the locking mechanism can mark the selected processor hardware resource busy. In an embodiment, the locking mechanism further can store the identity, or an indication thereof, of the requesting entity. In this regard, the locking mechanism can be configured to respond only to requests to release the selected processor hardware resource from the requesting entity unless the grant of control violates an established policy for reducing and/or eliminating errors such as a time limit or the like.

In step 630, the requesting entity optionally can configure the selected processor hardware resource. Step 630 illustrates a case in which the shared processor hardware resource may be configured differently for two or more different entities that share control over the processor hardware resource. For example, consider the case of a UART that is able to communicate at any one of multiple different data rates. A first requesting entity, e.g., a process executing within the core complex, can utilize the UART to communicate with a first external processing node at a first data rate, e.g., a 9600 baudrate. A soft processor within the programmable circuitry of the IC can utilize the same UART to communicate with a second external processing node at a second and different data rate, e.g., a 1200 baudrate.

Accordingly, in one aspect, the requesting entity must first determine whether the selected I/O device is properly configured to communicate as needed. For example, the selected I/O device may be configured to communicate using a different data rate than needed by the requesting entity that was granted control. In that case, the requesting entity must configure the processor hardware resource to communicate at the desired data rate.

In step 635, with the processor hardware resource properly configured, the requesting entity can initiate an operation on the selected processor hardware resource. In step 640, the selected processor hardware resource can perform the operation for the requesting entity. For example, the requesting entity can instruct the UART to fetch a particular amount of data from a target destination or processing node. The UART, responsive to that request, can fetch the requested data. In step 645, the selected processor hardware resource can generate an interrupt. The interrupt signifies to the requesting entity that the operation has been performed, e.g., that data is ready in response to the executed operation.

In step 650, responsive to the interrupt, the requesting entity can retrieve any data resulting from performance of the operation by the selected processor hardware resource. If, for example, the requesting entity is a soft processor within the programmable circuitry, the soft processor can service the interrupt and retrieve the data. In that case, the core complex is aware that no request was made to the selected processor hardware resource and/or that no process executing within the core complex has control over the processor hardware resource that issued the interrupt. Accordingly, the core complex can ignore the interrupt that is generated, thereby allowing circuitry within the programmable circuitry to service the interrupt. Similarly, when the core complex, or a process therein, is the requesting entity, the process within the core complex can service the interrupt while the soft processor within the programmable circuitry can ignore the interrupt. The soft processor, for example, can be aware that the soft processor does not have control over the particular processor hardware resource that issued the interrupt.

In step 655, the requesting entity can release the selected processor hardware resource. For example, the requesting entity can issue a release request to the locking mechanism. The locking mechanism, in response, can recognize that the release request originates from the requesting entity, e.g., the entity that was granted control over the selected processor hardware resource, and mark the selected processor hardware resource available in step 660. After step 660, method 600 can loop back to step 605 and continue monitoring for further requests to gain control over processor hardware resources of the PS.

As noted, FIG. 6 illustrates a coarse-grained approach to sharing of processor hardware resources of the PS between the PS and the programmable circuitry. In another embodiment, the sharing can be more fine-grained. In illustration, consider the case in which one or more processes executing within the core complex communicate with a particular processing node via a selected processor hardware resource such as a UART interface or an Ethernet interface. Circuitry implemented within the programmable circuitry, e.g., a soft processor, also can be configured to communicate with the same processing node via the same selected processor hardware resource.

In that case, substantially the same sharing, e.g., locking, mechanisms can be utilized. Rather than reconfiguring the selected processor hardware resource each time control over the selected processor hardware resource changes, both requesting entities can communicate with the processing node using the same parameters. For example, the configuration of the selected processor hardware resource can remain constant or static when switching from being accessed by the process executing within the core complex and the programmable circuitry. Both the programmable circuitry and the process executing within the core complex can communicate with the external processing node through the selected processor hardware resource at the same data rate. Accordingly, step 630 of FIG. 6 need not be performed when a fine-grained sharing approach is implemented.

FIG. 6 also describes an embodiment in which interrupt signals are utilized to notify the particular entity that has control over an processor hardware resource that data is ready from the processor hardware resource or that a particular operation has completed processing. In another embodiment, polling can be utilized in lieu of the interrupt mechanism(s) described. For example, the entity to which control over a processor hardware resource has been granted can be configured to poll the processor hardware resource, e.g., to check a status of the processor hardware resource rather than awaiting a notification or interrupt signal. The entity having control can periodically, continually, or from time-to-time, inquire with the processor hardware resource to determine a status of the transaction or operation being performed.

As noted, one or more embodiments include an IC having multiple, different power domains that facilitate power independence between the PS and the programmable circuitry. FIGS. 7-10, taken collectively, illustrate various aspects of power management within an IC in which the PS operates in a first power domain that is separate and independent of a second power domain in which the programmable circuitry operates. The programmable circuitry can, therefore, be powered off independently of the PS. In an embodiment, the PS can control the power on and/or power off processes of the programmable circuitry.

In view of the ability to power cycle the programmable circuitry independently of the PS, power management functions can include management of processor hardware resources during either one or both of power on and power off of the programmable circuitry. Further, power management functions can include management of any relationship that may be established between a processor hardware resource of the PS that is communicating with an external processing node, for example, when communications are routed through the programmable circuitry.

Figure 7:
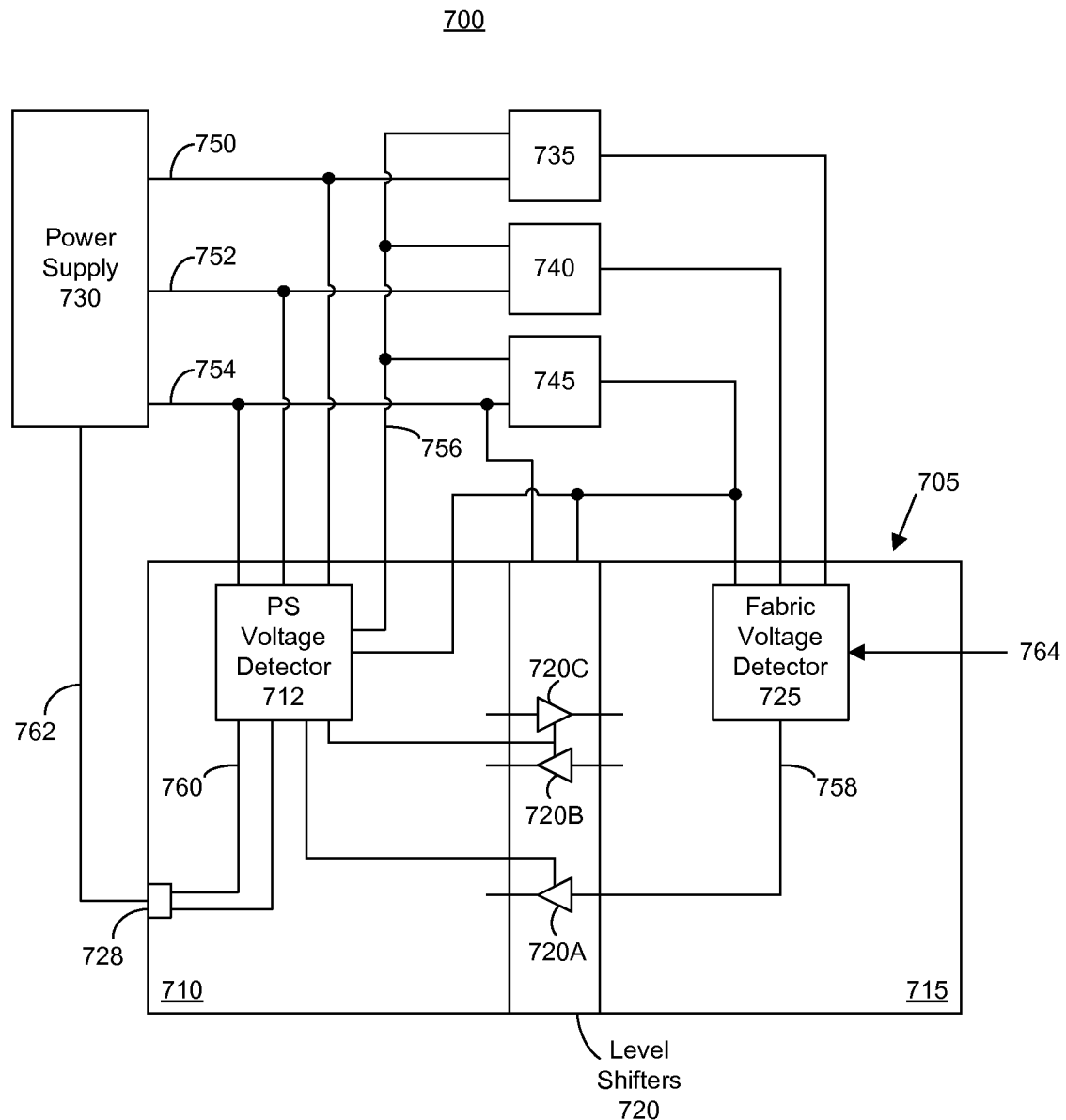
FIG. 7 is a sixth block diagram illustrating a system in accordance with another embodiment disclosed within this specification.

FIG. 7 is a sixth block diagram illustrating a system 700 in accordance with another embodiment disclosed within this specification. As shown, system 700 can include an IC 705, a power supply 730, and one or more switches shown as switches 735, 740, and 745. IC 705 can be implemented substantially as described with reference to the ICs depicted in FIGS. 1 and 2. FIG. 7, however, illustrates an abstracted view of IC 705 to more clearly illustrate power management functions. Accordingly, IC 705 can include a PS 710 and a programmable circuitry 715. In an embodiment, programmable circuitry 715 can be implemented in the form of an FPGA. PS 710 and programmable circuitry 715 can be coupled together by one or more level shifters 720 depicted as 720A-720C.

Power supply 730 can generate a plurality of power signals such as power signals 750, 752, and 754. In an embodiment, each of power signals 750-754 can have a different voltage potential. As shown, power signals 750-754 are coupled to a PS voltage detector 712 within PS 710 of IC 705.

Each of power signals 750-754 also can be coupled to one of switches 735-745, respectively. Switches 735-745 can be configured to selectively pass power signals 750-754 to fabric voltage detector 725 within programmable circuitry 715. Each of switches 735-745 can selectively pass power signals 750-754 to fabric voltage detector 725 responsive to a control signal 756 generated by PS 710. In an embodiment illustrated in FIG. 7, PS voltage detector 712 can generate control signal 756. When switches 735-745 are turned on, power signals 750-754 propagate to programmable circuitry 715. When turned off, switches 735-745 decouple power signals 750-754 from programmable circuitry 715.

PS voltage detector 712 can be configured to monitor power signals 750-754 and determine when each power signal 750-754 meets one or more different voltage thresholds to be described herein in further detail. As illustrated, PS voltage detector 712 is coupled to power signal 754 in two locations. PS voltage detector 712 can be coupled to power signal 754 at a location between power supply 730 and switch 745 and at a location between switch 745 and fabric voltage detector 725.

Power signal 750 can be implemented as a 1.2-1.8 volt power signal that can be used to provide power to I/Os of IC 705. Power signal 752 can be implemented as a 1.8 volt power signal that can be used to provide pre-driver voltages and bias voltages to IC 705. Power signal 754, for example, can be implemented as a 1 volt power signal that can be used to supply logic circuitry of IC 705. The examples and values described are for purposes of illustration and, as such, are not intended as limitations of the one or more embodiments disclosed within this specification.

Level shifters 720 can be implemented as described with reference to level shifting circuitry 296 of FIG. 2. As shown, level shifters 720 can be coupled to power signal 754 in two locations, e.g., prior to switch 745 and as output from switch 745. In general, each of switches 735-745 will have some resistance that causes a voltage drop so that the output from each respective switch will have a voltage that is less than the power signal provided as input to the switch. Thus, in cases where two power domains are intended to operate at the same voltages, fluctuations in voltage on the power signals provided to each power domain can occur due to resistance of switches 735-745 as well as one or more other factors. Level shifters 720 can account for these fluctuations in voltage in order to pass signals between the first power domain, i.e., PS 710, and the second power domain, i.e., programmable circuitry 715.

As shown, programmable circuitry 715 also can include a voltage detector illustrated as fabric voltage detector 725. Fabric voltage detector 725 can detect when each of signals 750-754 reaches a predetermined voltage level and, in response, generate signal 758. Signal 758 can be provided to PS 710 via a level shifter 720A. Level shifter 720A, for example, can be implemented as the fourth class of level shifter. It should be appreciated that, while not shown, the power signals can be distributed throughout PS 710 from PS voltage detector 712 or from one or more other components. Similarly, power signals can be distributed throughout programmable circuitry 715 from fabric voltage detector 725 or one or more other components. In addition, fabric voltage detector 725 can be implemented as hard-wired circuitry along with one or more other system-level components of IC 700 despite being located within programmable circuitry 715.

In operation, IC 700 can be powered on. Power supply 730, for example, can begin supplying power to IC 700. PS 710 can aid in powering on programmable circuitry 715 and in configuration of programmable circuitry 715. Immediately upon supplying power to PS 710, PS voltage detector 712 can begin to monitor voltages on power signals 750-754. Responsive to determining that one or more or all of the voltages on power signals 750-754 meets a first, predetermined minimum voltage level, also referred to as the minimum IOB voltage, PS voltage detector 712 can enable an IOB 728 via control signal 760.

In general, when PS voltage detector 712 enables IOB 728, PS voltage detector 712 has determined that the voltage potential received via one or more or all of power signals 750-754 is sufficient to drive IOB 728, e.g., has met the minimum IOB voltage. For example, IOB 728 can be enabled by coupling an internal power signal to IOB 728. The minimum IOB voltage can be high enough for IOB 728 to operate, but need not be high enough to initiate startup or boot of PS 710. Accordingly, the minimum IOB voltage still can be lower than a preferred or legal voltage range for operation of PS 710 within an operational mode.

Once active, IOB 728 is able to receive a power indication signal 762. Power indication signal 762 can be provided by power supply 730 or another external source. Power indication signal 762, for example, can be set high when power supply 730 is stable and, thus, when power signals 750-754 are stable and within the range necessary for startup of PS 710 to begin. Accordingly, though PS 710 utilizes PS voltage detector 712 to enable IOB 728, PS 710 relies upon power indication signal 762 to indicate when power supply 730 is operational and stable.

Responsive to receiving power indication signal 762, e.g., the signal going high, PS 710 can begin a boot or startup process. The startup process is described in greater detail with reference to the remaining figures. In an embodiment, as part of the startup process, PS voltage detector 712 can turn on switches 735-745 via control signal 756, thereby coupling programmable circuitry 715 with power signals 750-754.

With switches 735-745 turned on, PS voltage detector 712 can monitor the voltage on power signal 754 as output from switch 745. When PS voltage detector 712 determines that the voltage on signal 754 meets a second, predetermined minimum voltage, referred to as the minimum level shifter voltage, PS voltage detector 712 can enable one or more of level shifters 720, e.g., level shifter 720A. The minimum level shifter voltage can be one that is sufficient for one or more selected devices within programmable circuitry 715 to operate, e.g., level shifter 720A.

In an embodiment, the minimum level shifter voltage can be one that is high enough for programmable circuits and/or one or more of level shifters 720, e.g., circuits implemented using complementary metal-oxide semiconductor (CMOS) devices, to function. The minimum level shifter voltage can be one that, while large enough for devices to function, still is lower than a preferred or legal voltage range necessary for operation of devices within programmable circuitry 715 to support, for example, configuration functions and programmable circuitry 715 generally to be in an operational mode. The minimum IOB voltage can, but need not, be the same or equal to the minimum level shifter voltage.

Further, with switches 735-745 enabled, fabric voltage detector 725 can begin operation. Fabric voltage detector 725 can begin monitoring the voltage on each of power signals 750-754 to determine when the voltage on one or more or all of power signals 750-754 meets a third predetermined minimum voltage that is required for operation of programmable circuitry 715 referred to as the minimum programmable circuitry voltage.

Responsive to fabric voltage detector 725 determining that the voltage on one or more or all of power signals 750-754 meets the minimum programmable circuitry voltage, fabric voltage detector 725 can generate signal 758, e.g., a programmable circuitry power indication signal, to PS 710 indicating that programmable circuitry 715 is powered-on. For example, when one or more or all of power signals 750-754 meets the minimum programmable circuitry voltage, fabric voltage detector 725 can bring signal 758 high. The minimum programmable circuitry voltage is the minimum, legal voltage level required for programmable circuitry 715 to function properly, e.g., remain in the operational mode, and undergo configuration. The minimum programmable circuitry voltage is generally higher than the minimum IOB voltage and/or the minimum level shifter voltage. Generation of signal 758 in response to fabric voltage detector 725 determining that one or more or all of power signals 750-754 meet the minimum programmable circuitry voltage indicates that programmable circuitry 715 is ready for configuration, e.g., for configuration data to be loaded to implement physical circuitry therein.

In an embodiment, fabric voltage detector 725 can operate in one of two different modes. The particular mode in which fabric voltage detector 725 operates can be selected responsive to a control signal 764 received from an external source. Depending upon the state of control signal 764, fabric voltage detector 725 can operate in a first mode or a second mode.

In the first mode, fabric voltage detector 725 can wait a predetermined amount of time after determining that one or more or all power signals 750-754 meet the minimum programmable circuitry voltage before generating signal 758, e.g., bringing signal 758 high. The amount of time, for example, can be approximately 50 milliseconds, though other time periods also can be used. In the second mode, fabric voltage detector 725 can generate signal 758 immediately in response to determining that one or more or all of power signals 750-754 meets the minimum programmable circuitry voltage. Signal 758 indicates to PS 710 that programmable circuitry 715 is functional, e.g., is in an operational mode, and can be configured to implement one or more different circuits.

While FIG. 7 is described using switches and common power signals between PS 710 and programmable circuitry 715 to achieve independent power domains, similar results can be achieved in a variety of different ways. For example, two completely independent power supplies can be used. In that case, rather than providing a control signal to external switches, control signal 764 can be provided to the power supply providing power to programmable circuitry 715 to power programmable circuitry 715 on and/or off. In another example, switches can be included within IC 700. In that case, control signal 756 can be provided to the switches located within IC 700 to power programmable circuitry 715 on and/or off.

Figure 8:
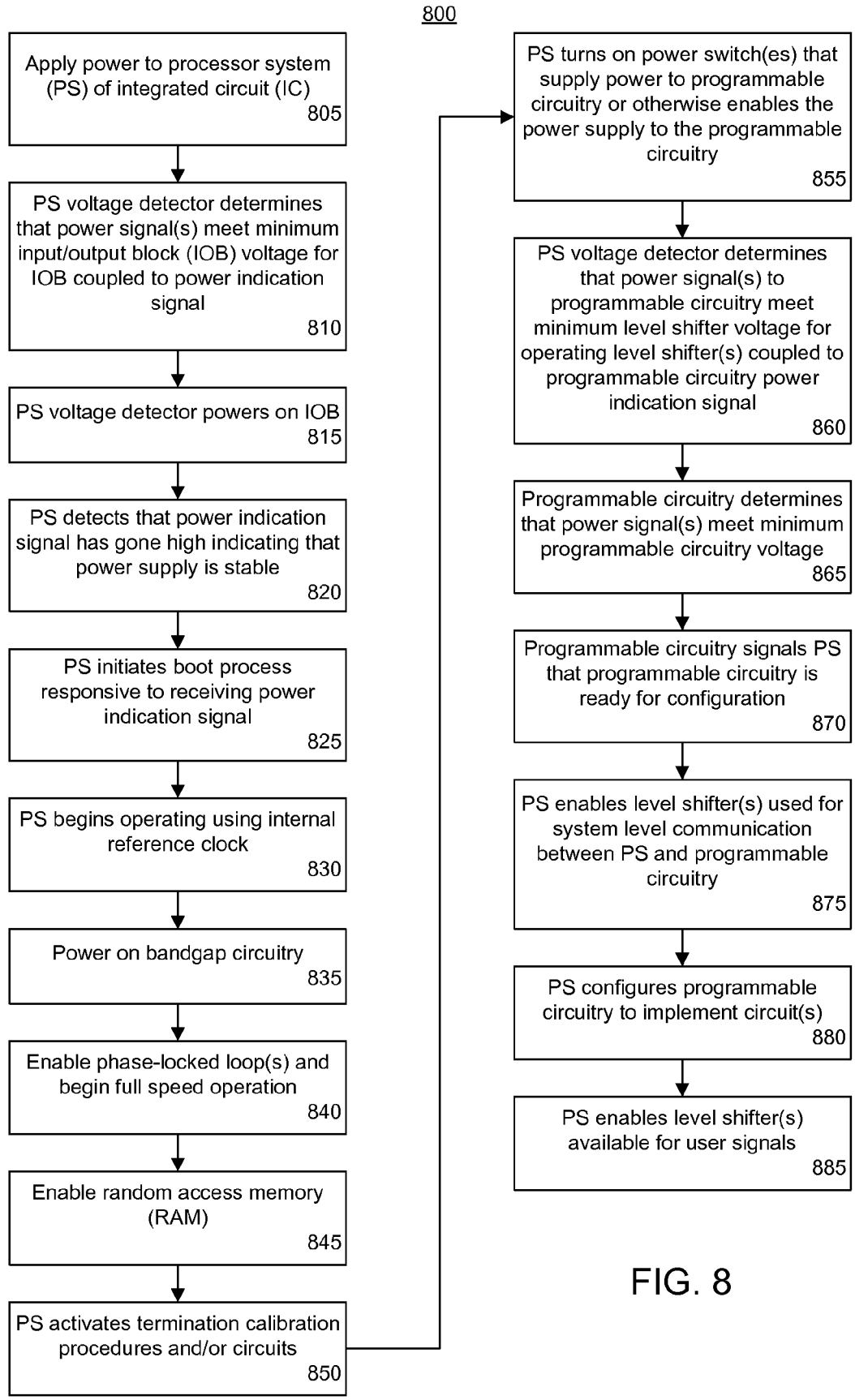
FIG. 8 is a second flow chart illustrating a method of power management for an IC in accordance with another embodiment disclosed within this specification.

FIG. 8 is a second flow chart illustrating a method 800 of power management for an IC in accordance with another embodiment disclosed within this specification. More particularly, method 800 illustrates an exemplary method of powering on an IC. Method 800 can be performed by an IC as described with reference to FIGS. 1-7 of this specification.

Accordingly, in step 805, power can be applied or coupled to the PS of the IC. In step 810, the PS voltage detector can determine that the power signal(s) supplied to the PS meet the voltage requirements, e.g., the minimum IOB voltage, to operate the IOB that is coupled to an externally generated power indication signal. Accordingly, in response to determining that the power signal(s) meet the minimum IOB voltage, in step 815 the PS voltage detector can power on the IOB that is coupled to the power indicator signal. In an embodiment, the required voltage level for operation of the IOB can be less than the voltage level typically required for operation of the PS.

In step 820, the PS can detect that the power indication signal has gone high indicating that the power supply has reached a stable state. For example, the power indication signal can be held low by the power supply external to the IC until the stable state is achieved. Once the stable state is achieved, the power supply can bring the power indication signal high, indicating that the required voltage for operation of the PS is available from the power supply. The PS voltage detector can detect the state change in the power indication signal due to activation of the IOB to which the power indication signal is coupled in step 815.

In step 825, responsive to detecting the high state of the power indicator signal, the PS voltage detector can initiate a boot or startup process in the PS. Steps 830-850, in general, describe the startup process that can be performed by the PS. In step 830, the PS can begin operating using an internally generated reference clock. The internally generated reference clock, for example, can be generated by clock unit 226 of FIG. 2. In general, the internal reference clock operates at a frequency that is less than the frequency of the clock signal used to ultimately clock the PS during normal operation, e.g., the operational mode. For example, in an embodiment, the internal clock signal can have a frequency of approximately 30 MHz.

In step 835, the PS can enable, or power on, the bandgap circuitry. The bandgap circuitry, for example, can be located within the clock unit of the PS and, in general, provides a reference voltage for use by PLLs also located within the clock unit. Accordingly, in step 840, the PS can enable the PLLs and begin full speed operation. For example, when operating using the internally generated reference clock, the PLLs of the clock unit are bypassed. Upon enablement of the bandgap circuitry and the PLLs, the PLLs are no longer bypassed, thereby allowing the PS to operate at full speed according to an externally provided clock signal to which the PLLs of the clock unit can synchronize. As noted, the frequency of the clock signal output by the PLLs, once operational, can be significantly higher than the internally generated reference clock.

In step 845, the PS can enable RAM that is coupled to the PS via the memory controller. In step 850, the PS can activate any termination calibration procedures and/or circuits thereby synchronizing with the RAM. In general, after step 850, the PS can be considered to be in an operational mode. The PS, for example, can execute program code having exited the reset state. In another example, the PS can also begin to manage power for the programmable circuitry.

In step 855, the PS can begin managing power on procedures of the programmable circuitry portion of the IC. For example, in step 855, the PS can turn on the switches that supply power to the programmable circuitry of the IC or otherwise enable the power supply to the programmable circuitry. For example, the PS can, via a control signal, instruct the switches to turn on, thereby allowing any power signals received by the switches to be output, and propagate to, the programmable circuitry.

In step 860, the PS voltage detector determines that power signal(s) to the programmable circuitry meet the minimum level shifter voltage for operating level shifter(s) coupled to the programmable circuitry power indication signal. In step 865, the programmable circuitry can determine that the power signal(s) meet the minimum programmable circuitry voltage. In step 870, responsive to determining that the power signal(s) meet the minimum programmable circuitry voltage, the programmable circuitry signals the PS that the programmable circuitry is ready for configuration. As noted, the programmable circuitry can communicate readiness for configuration through the programmable circuitry power indication signal that is coupled to one of the system level shifters that has been enabled by the PS.

In step 875, the PS can enable any level shifters used for communicating system level signals between the PS and the programmable circuitry. In an embodiment, the PS can enable level shifters that do not require configuration of the programmable circuitry. One or more level shifters that propagate clock signals passed between the PS and the programmable circuitry also can be enabled.

When disabled, each level shifter can be configured to output a constant value, e.g., either a low or a high. Once enabled, the output of the level shifter becomes dependent upon the input provided to the level shifter. In an embodiment, when the level shifter receives a logic high, the level shifter can output a logic high. when the level shifter receives a logic low, the level shifter can output a logic low. In another embodiment, the level shifter can be configured to output a complementary value. For example, when the level shifter receives a logic high as an input, the level shifter can output a logic low. Similarly, when the level shifter receives a logic low as an input signal, the level shifter can be configured to output a logic high. In any case, when disabled, the level shifter can be configured to output a constant logic high or a constant logic low.

In step 880, the PS can configure the programmable circuitry to implement one or more circuits. In an embodiment, the PS, being operational, can access configuration data for the programmable circuitry from a storage location located off-chip. For example, the PS can retrieve configuration data from an external memory or issue a request for the configuration data over a communication link, e.g., an Ethernet connection. The configuration data, as received by the PS, can be provided to the PCAP interface and sent to the configuration controller within the programmable circuitry. The configuration controller in turn loads the configuration data into the configuration memory cells thereby implementing the physical circuitry specified by the configuration data.

In step 885, the PS can enable level shifter(s) that are available for passing user signals between the PS and the programmable circuitry. After step 885, the entire IC is operational. As noted, the PS is in an operation mode and is capable of executing program code. Further, the programmable circuitry is an operation mode. In an embodiment, the programmable circuitry can be released from a reset type of state subsequent to configuration through generation of a user specified signal. The user specified signal can be one that is generated by circuitry implemented within the programmable circuitry in consequence of the loading of configuration data as described with reference to step 880.

Figure 9:
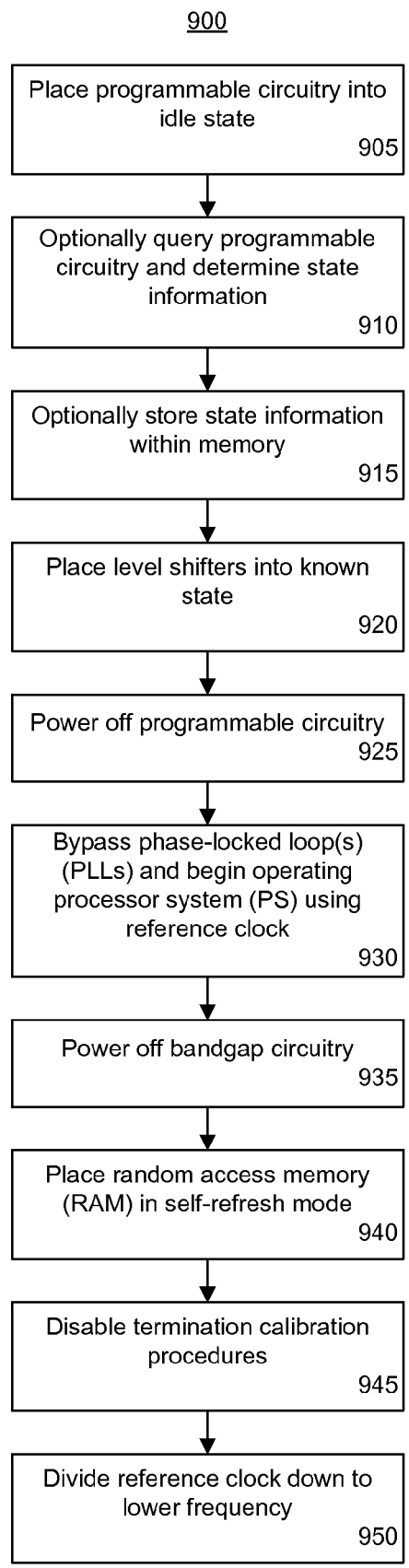
FIG. 9 is a third flow chart illustrating a method of power management for an IC in accordance with another embodiment disclosed within this specification.

FIG. 9 is a third flow chart illustrating a method 900 of power management for an IC in accordance with another embodiment disclosed within this specification. More particularly, method 900 illustrates one technique for powering off the programmable circuitry of an IC configured as described with reference to FIGS. 1-8 of this specification. Method 900 illustrates how power management of the IC, including the programmable circuitry, can be performed by the PS. Method 900 can begin in a state where both the PS and the programmable circuitry are operational, e.g., in an operation mode. The PS can be executing program code and the circuitry implemented within the programmable circuitry can be operating. Responsive to some signal or event, the PS can determine that the programmable circuitry is to be powered off and, accordingly, can begin a power off procedure for the programmable circuitry.

Beginning in step 905, the PS can initiate a power off procedure within the programmable circuitry that allows state of circuitry implemented within the programmable circuitry to be stored and, at least in part, subsequently restored when the programmable circuitry is powered on again. The power off procedure, as it relates to the programmable circuitry, generally includes steps 905-925.

Accordingly, in step 905, the PS can place the programmable circuitry into an idle state. For example, the PS can place the programmable circuitry into a state in which any operations that are in progress or that have been provided to the programmable circuitry are allowed to complete, while preventing any further, or new, transactions from entering the programmable circuitry. When operations to the programmable circuitry have completed, for example, the PS can halt the programmable circuitry, e.g., gate various clock signals provided to the programmable circuitry and the like. Accordingly, the programmable circuitry is no longer in the operational mode.

In step 910, the PS optionally can query the programmable circuitry and determine state information for the circuitry implemented within the programmable circuitry, e.g., for the user circuitry. In an embodiment, data stored within the programmable circuitry can be obtained by the PS using a configuration read-back function, a boundary scan function, or the like. For example, data stored in one or more memories within the programmable circuitry can be obtained or read by the PS. Such data can include a table of coefficients, or other data needed by the circuitry implemented within the programmable circuitry. In another example, when a soft processor such as the MicroBlaze™ is implemented within the programmable circuitry, the values stored in registers as well as the contents of program memory of the soft processor within the programmable circuitry can be obtained.

In step 915, the PS optionally can store the state information obtained from the programmable circuitry in memory. In an embodiment, the PS can store the state information within a memory that is located off-chip. For example, the PS can store the state information within an external RAM. In another embodiment, the PS can store the state information within an internal memory. For example, the PS can store the state information within the OCM described with reference to FIG. 2, which is located within the PS.

In step 920, the PS, e.g., the core complex, can place the level shifters that couple the programmable circuitry with the PS into a known state. For example, the level shifters can be placed in a state to maintain a logic zero or a logic one. In some cases, some level shifters can be configured to maintain a logic zero while other level shifters are configured to maintain a logic one. Placing the level shifters into a known state prevents spurious signals from triggering events within the PS. For example, spurious signals while the programmable circuitry is powered off can cause PS systems or components coupled to the level shifters, e.g., an I/O device coupled to the FMIO interface, another PS block coupled through another interface with the programmable circuitry, to erroneously generate events such as interrupts. When the interrupt is to be serviced by the programmable circuitry and the programmable circuitry is powered off, the interrupt is not serviced, thereby causing unresolved events or other problems within the PS.

In step 925, the PS can power off the programmable circuitry. For example, the PS, via a control signal, can instruct the switches to decouple the programmable circuitry from the power signals. Once the programmable circuitry is powered off, the PS can continue to operate and execute program code in a normal operating state. Alternatively, subsequent to powering off the programmable circuitry, the PS optionally can be placed into a low power mode. While in low power mode, the PS does not execute program code and consumes significantly less power than when in the operational mode where the system clocks, for example, are operating at full speed.

Accordingly, steps 930-950 can be optional in nature and illustrate steps for placing the PS in the low power, e.g., sleep, mode. In an embodiment, for example, the PS can be configured to initiate low power mode responsive to powering off the programmable circuitry. In another embodiment, the PS can be instructed to enter low power mode responsive to a signal or interrupt received from a source external to the IC.

In step 930, the PS can bypass the PLL(s) operating within the clock unit. When the PLL(s) are bypassed, the PS can begin operating using the internally generated reference clock. In step 935, the PS can power off the bandgap circuitry. In step 940, the PS can place the RAM in a self-refresh mode. In step 945, the PS can disable termination calibration functions for the RAM. In step 950, the reference clock can be frequency divided to further reduce power consumption within the PS. For example, the internally generated clock, having a frequency of approximately 30 MHz, can be frequency divided down to approximately 1 MHz.

It should be appreciated that that PS can be brought out of the low power mode substantially by performing steps 950-30 in the reverse order.

Figure 10:
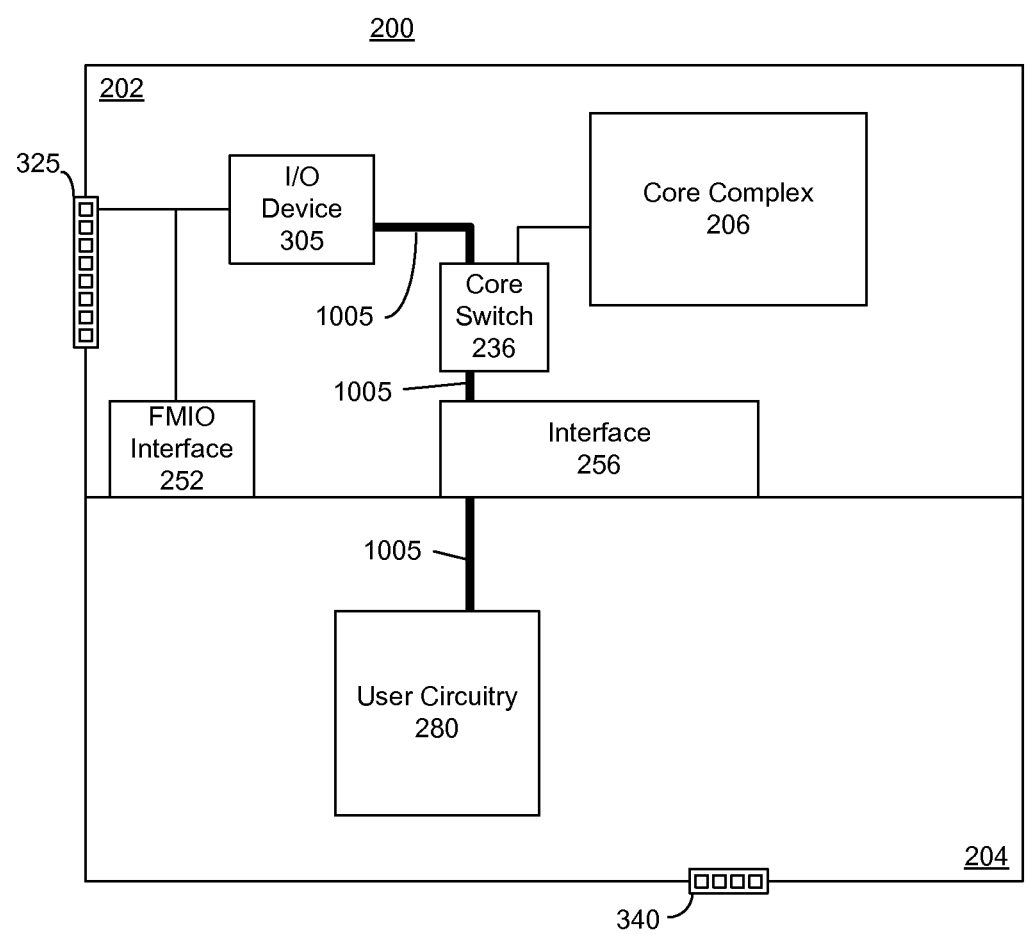
FIG. 10 is a seventh block diagram illustrating the IC of FIG. 2 in accordance with another embodiment disclosed within this specification.

FIG. 10 is a seventh block diagram illustrating IC 200 of FIG. 2 in accordance with another embodiment disclosed within this specification. FIG. 10 depicts an abstracted view of IC 200 to illustrate management of I/O device 305 of PS 202 when programmable circuitry programmable circuitry 204 is powered down. One or more components within IC 200 are not shown for clarity and ease of illustration. For example, switches 315 and 320 and various other components within programmable circuitry 204 are not shown in FIG. 10.

FIG. 10 illustrates an embodiment in which I/O device 305 is coupled to an external processing node (not shown) through one or more of I/O pins 325. As pictured, the primary entity that services and interacts with I/O device 305 is user circuitry 280 implemented within programmable circuitry 204. In the example shown, I/O device 305 communicates with user circuitry 280 through core switch 236 and interface 256 via the signal path labeled 1005.

In an embodiment, responsive to determining that programmable circuitry 204 is to be powered off, core complex 206 can be configured to obtain control of I/O device 305. When programmable circuitry 204 is powered off in the configuration shown in FIG. 10, I/O device 305 is no longer available to the processing node without changing control as described within this specification.

Core complex 206, for example, can signal the particular locking mechanism utilized to track control over I/O device 305 that core complex 206 is taking control away from user circuitry 280. In an embodiment, core complex 206 can include or execute program code that provides some or all of the particular functionality implemented by user circuitry 280. Thus, when user circuitry 280 is powered off, core complex 206 can take over functions previously performed by user circuitry 280, at least with regard to I/O device 305. In one example, core complex 206 can maintain the communication link between I/O device 305 and the external processing node.

Figure 11:
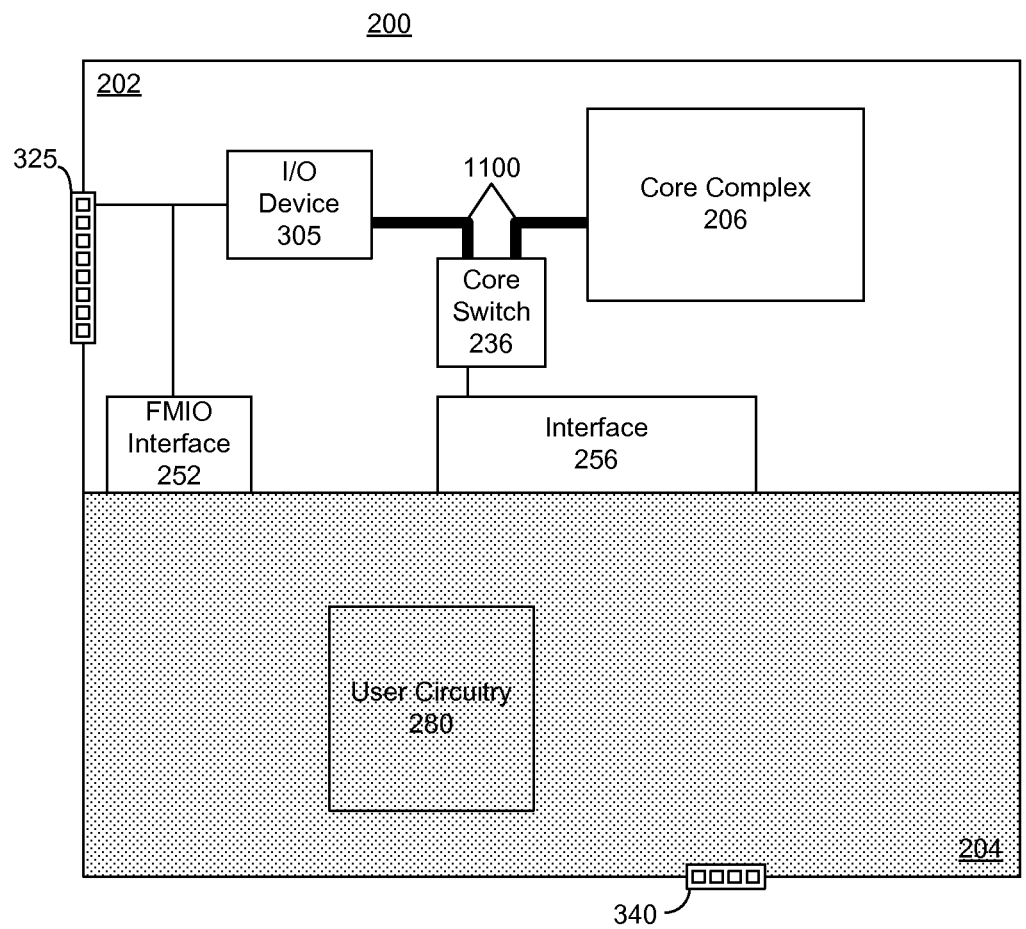
FIG. 11 is an eighth block diagram illustrating the IC of FIG. 2 in accordance with another embodiment disclosed within this specification.

FIG. 11 is an eighth block diagram illustrating IC 200 of FIG. 2 in accordance with another embodiment disclosed within this specification. FIG. 11 illustrates the state of IC 200 subsequent to powering off programmable circuitry 204. To illustrate that programmable circuitry 204 is powered off and not available, programmable circuitry 204 is shown with shading. As shown, core complex 206 has obtained control over I/O device 305 and has started servicing I/O device 305. Communications are now conducted between core complex 206 and I/O device 305 through the signal pathway labeled as 1100. Thus, rather than continue to route communications from I/O device 305 to programmable circuitry 204, communications are provided to core complex 206 for servicing.

In illustration, consider the case in which I/O device 305 implements a USB interface to an external processing node. User circuitry 280 implemented within programmable circuitry 204, for example, can implement video processing circuitry to process video carried over the USB communication link. Without changing control over I/O device 305 when programmable circuitry 204 is powered off, the video provided to the external processing node would stop. By providing control over I/O device 305 to core complex 206, core complex 206 can maintain the USB communication link.

In an embodiment, core complex 206 can, through execution of program code, provide the same functionality that was provided by user circuitry 280. Because the functionality, e.g., in this case video processing, is performed by core complex 206 through execution of program code, the performance may be reduced as compared to user circuitry 280. In another embodiment, core complex 206 can provide varied or different functionality. For example, rather than continuing to process video, core complex 206 can output video signals that specify an image stating that video processing is temporarily unavailable. Other forms of reduced or limited functionality can be provided. In either case, however, the communication link with the external processing node is maintained, e.g., the electrical communication channel is preserved.

Figure 12:
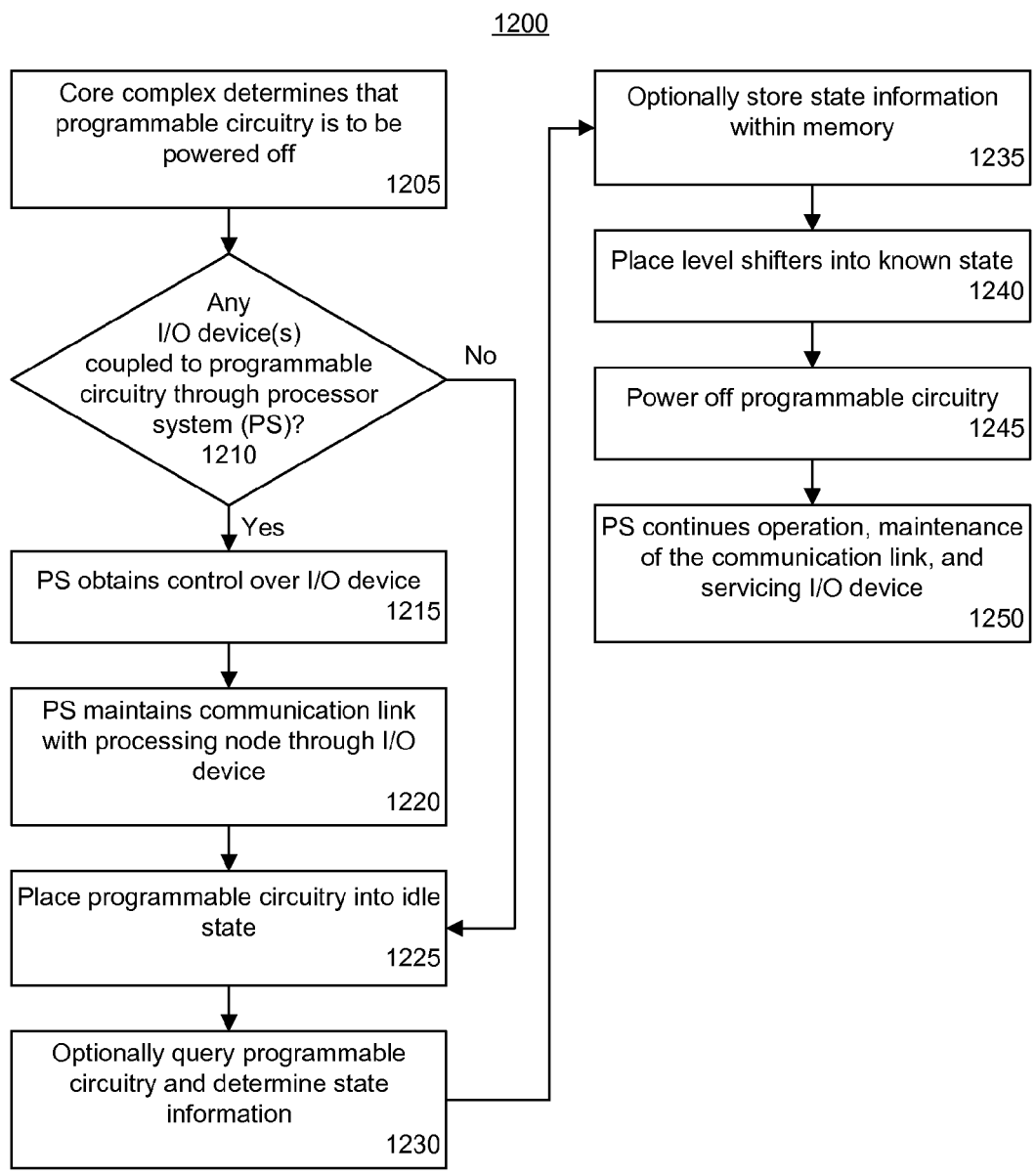
FIG. 12 is a fourth flow chart illustrating a method of power management for an IC in accordance with another embodiment disclosed within this specification.

FIG. 12 is a fourth flow chart illustrating a method 1200 of power management for an IC in accordance with another embodiment disclosed within this specification. Method 1200 illustrates a technique for power management within an IC that accounts for control over I/O devices that may be coupled to circuitry implemented within the programmable circuitry. For example, method 1200 illustrates a technique for power management of an IC as illustrated and described with reference to FIGS. 10 and 11 of this specification.

Method 1200 can begin in a state where the IC is powered on and fully operational. For example, at least one I/O device can be communicatively linked to an external processing node through one or more I/O pins dedicated for use by the PS. The I/O device also can be coupled to user circuitry implemented within the programmable circuitry through the core switch and an interface. The user circuitry, for example, can be configured to service the I/O device.

In step 1205, the core complex can determine that the programmable circuitry is to be powered off. As discussed, the PS can be configured to control power functions of the programmable circuitry. In one example, the core complex itself can determine, e.g., through execution of program code and application of particular programmatically specified logic, that the programmable circuitry is to be powered off. In another example, the IC, e.g., the core complex, can receive a notification or signal from another external processing node requesting that the programmable circuitry be powered off.

In step 1210, the core complex can determine whether any of the I/O devices contained within the PS are coupled to the programmable circuitry through the PS, e.g., through one or more of the interfaces. The core complex, for example, can check configuration of the I/O devices, interfaces, core switch, etc., via the control register located within the PS to determine which I/O devices, if any, are serviced by user circuitry within the programmable circuitry. When one or more I/O devices are coupled to programmable circuitry through the PS, the method can continue to step 1215. When none of the I/O devices are coupled to programmable circuitry through the PS, the method can continue to step 1225.

In step 1215, the PS can obtain control over the I/O device. For example, the core complex can be configured to reconfigure communication links within the PS as illustrated with respect to FIGS. 10 and 11, so that information received from the I/O device is directed to the core complex instead of the programmable circuitry. In the event that a locking mechanism is utilized within the PS, the core complex can instruct the locking mechanism that the core complex is taking exclusive control over the I/O device. For purposes of illustration, method 1200 presumes that one I/O device is coupled to the programmable circuitry through the PS. It should be appreciated, however, that more than one I/O device can be coupled to the programmable circuitry and that the steps described with reference to FIG. 12 can be applied to such cases.

In step 1220, the PS can begin to maintain the communication link between the external processing node and the I/O device. The PS can service the external processing node and I/O device and, further, perform functionality once provided by the user circuitry within the programmable circuitry. As noted, the PS can provide the full functionality of the user circuitry or can provide a limit subset of the functionality provided by the user circuitry.

In step 1225, the PS can place the programmable circuitry into an idle state. In step 1230, the PS optionally can query the programmable circuitry and determine state information for the circuitry implemented within the programmable circuitry, e.g., for the user circuitry. As noted, data stored within the programmable circuitry can be obtained by the PS using a configuration read-back function, a boundary scan function, or the like. In step 1235, the PS optionally can store the state information obtained from the programmable circuitry in memory.

In step 1240, the PS, e.g., the core complex, can place the level shifters that couple the programmable circuitry with the PS into a known state. In step 1245, the PS can power off the programmable circuitry. In step 1250, the PS can continue to operate, e.g., executing program code, and can maintain the communication link between the I/O device and the external processing node coupled thereto. The PS can continue servicing the I/O device.

Figure 13:
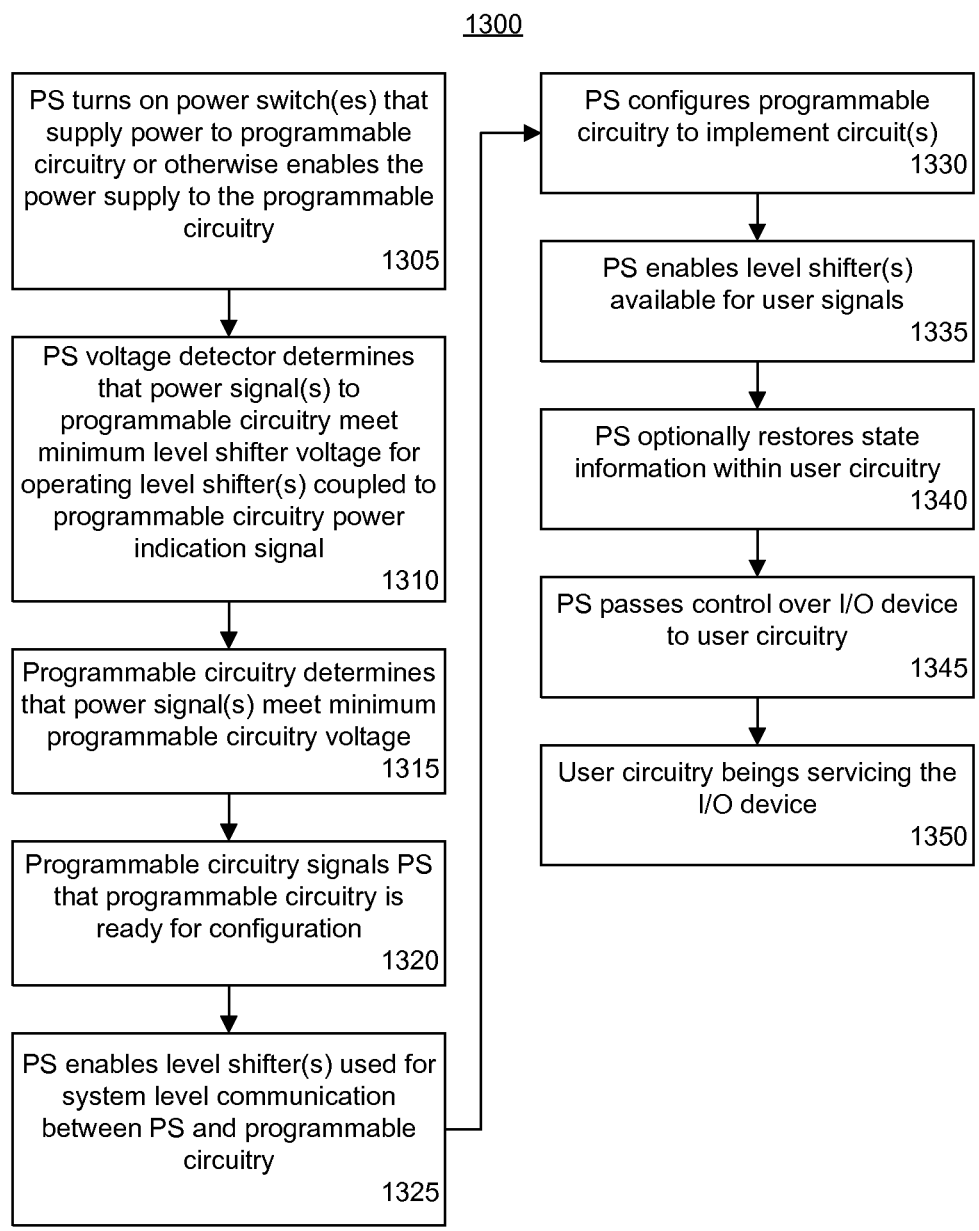
FIG. 13 is a fifth flow chart illustrating a method of power management for an IC in accordance with another embodiment disclosed within this specification.

FIG. 13 is a fifth flow chart illustrating a method 1300 of power management for an IC in accordance with another embodiment disclosed within this specification. Method 1300 illustrates a technique for power management within an IC that accounts for control over I/O devices that may be coupled to circuitry implemented within the programmable circuitry. More particularly, method 1300 illustrates an example in which the programmable circuitry is powered on and control over an I/O device is provided back to the programmable circuitry from the core complex. Method 1300 can be performed using a system as demonstrated with respect to FIGS. 10-12 of this specification.

Method 1300 can begin in a state where the PS is operational and the programmable circuitry is powered off. More particularly, method 1300 can begin in a state where the core complex of the PS has obtained control over an I/O device that, prior to powering off of the programmable circuitry, was controlled by user circuitry implemented within the programmable circuitry as described with reference to FIG. 12.

Accordingly, in step 1305, the PS can turn on the switches that supply power to the programmable circuitry of the IC or otherwise enable the power supply to the programmable circuitry. In step 1310, the PS voltage detector can determine that power signal(s) to the programmable circuitry meet the minimum level shifter voltage for operating level shifter(s) coupled to the programmable circuitry power indication signal. In step 1315, the programmable circuitry can determine that the power signal(s) meet the minimum programmable circuitry voltage.

In step 1320, responsive to determining that the power signal(s) meet the minimum programmable circuitry voltage, the programmable circuitry signals the PS that the programmable circuitry is ready for configuration. In step 1325, the PS can enable any level shifters used for communicating system level signals between the PS and the programmable circuitry. In an embodiment, the PS can enable level shifters that do not require configuration of the programmable circuitry. One or more level shifters that propagate clock signals passed between the PS and the programmable circuitry also can be enabled.

In step 1330, the PS can configure the programmable circuitry to implement one or more circuits. In an embodiment, the PS, being operational, can access configuration data for the programmable circuitry from a storage location located off-chip. For example, the PS can retrieve configuration data from an external memory or issue a request for the configuration data over a communication link, e.g., an Ethernet connection. The configuration data, as received by the PS, can be provided to the PCAP interface and sent to the configuration controller within the programmable circuitry. The configuration controller in turn loads the configuration data into the configuration memory cells thereby implementing the physical circuitry specified by the configuration data.

In one example, a same circuit design, e.g., a same design for the user circuitry, can be reloaded into the programmable circuitry that was in existence prior to the programmable circuitry being powered off. In another example, a modified version, e.g., an upgraded version, of the user circuitry implemented in the programmable circuitry prior to powering off can be implemented via the loading of configuration data. In still another example, an entirely different circuit design can be implemented within the programmable circuitry as user circuitry that is significantly different from the user circuitry implemented within the programmable circuitry prior to powering off the programmable circuitry.

In step 1335, the PS can enable level shifter(s) that are available for passing user signals between the PS and the programmable circuitry. In step 1340, any stored state data optionally can be restored, e.g., reloaded, within the user circuitry implemented within the programmable circuitry. After step 1340, the entire IC is operational. As noted, the PS is in an operation mode and is capable of executing program code. Further, the programmable circuitry is an operation mode. In an embodiment, the programmable circuitry can be released from a reset type of state subsequent to configuration through generation of a user specified signal. The user specified signal can be one that is generated by circuitry implemented within the programmable circuitry in consequence of the loading of configuration data as described with reference to step 1330.

In step 1345, the PS, e.g., the core complex, responsive to the programmable circuitry being released from the reset state, can pass control over the I/O device to the user circuitry implemented within the programmable circuitry. As described with reference to FIG. 12, the core complex can assume control over an I/O device from the user circuitry implemented within the programmable circuitry. In the event that a locking mechanism is utilized within the PS, the core complex can instruct the locking mechanism that the core complex has passed control, e.g., exclusive control, over the I/O device to the user circuitry. The core complex can be configured to reconfigure communication links within the PS so that the I/O device is again coupled with the user circuitry through the core switch and the interface. For example, data pathways can be changed from that illustrated in FIG. 11, to that illustrated in FIG. 10 so that information flows between the I/O device and the user circuitry via the core switch and the interface.

In step 1350, responsive to control being passed to the user circuitry from the core complex, the user circuitry can begin servicing the I/O device. In this regard, the communication link between the I/O device and the processing node external to the IC coupled to the I/O device is not severed or otherwise lost. In the case where the core complex provides only reduced functionality as compared to the user circuitry, full functionality can be restored and be available to the processing node via the I/O device.

As noted with respect to FIG. 12, for purposes of illustration, method 1300 presumes that one I/O device is coupled to the programmable circuitry through the PS. It should be appreciated, however, that more than one I/O device can be coupled to the programmable circuitry and that the steps described with reference to FIG. 13 can be applied to such cases.

The flowcharts in the figures illustrate the architecture, functionality, and operation of possible implementations of systems, methods and computer program products according to one or more embodiments disclosed within this specification. In this regard, each block in the flowcharts can represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

One or more embodiments can be realized in hardware or a combination of hardware and software. One or more embodiments can be realized in a centralized fashion in one system or in a distributed fashion where different elements are spread across several interconnected systems. Any kind of data processing system or other apparatus adapted for carrying out at least a portion of the methods described herein is suited.

One or more embodiments further can be embedded in a device such as a computer program product, which comprises all the features enabling the implementation of the methods described herein. The device can include a data storage medium, e.g., a non-transitory computer-usable or computer-readable medium, storing program code that, when loaded and executed in a system comprising memory and a processor, causes the system to perform at least a portion of the functions described within this specification. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. An integrated circuit comprising:
   a processor system comprising a core complex having a core configured to execute program code, wherein the processor system is hard-wired and comprises a processor hardware resource; and
   a programmable circuitry configurable to implement different physical circuits and coupled to the processor system,
   wherein the programmable circuitry is configurable to share usage of the processor hardware resource with the core complex;
   wherein the processor hardware resource is configured to generate an interrupt signal that is provided to the programmable circuitry and the processor system; and
   wherein the core complex comprises a cache memory and the programmable circuitry has direct read and write access to the cache memory of the core complex.

2. The integrated circuit of claim 1, wherein the processor hardware resource is an input/output (I/O) device located within the processor system.

3. The integrated circuit of claim 2, wherein, responsive to the interrupt signal:
   the core complex services the interrupt signal when the core complex has control over the processor hardware resource; and
   the programmable circuitry services the interrupt signal when the programmable circuitry has control over the processor hardware resource.

4. The integrated circuit of claim 2, wherein the programmable circuitry comprises a user circuit communicatively linked to a processing node external to the integrated circuit via an I/O pin dedicated for use by the programmable circuitry, wherein the user circuit is communicatively linked to the I/O device via an interface coupling the programmable circuitry with the processor system, wherein the user circuit provides data received from the processing node to the I/O device via the interface.

5. The integrated circuit of claim 2, wherein:
the programmable circuitry comprises a user circuit having a communication link with a processing node external to the integrated circuit through the processor hardware resource;
the core complex is configured to take control of the processor hardware resource responsive to determining that the programmable circuitry is to be powered off; and
the core complex maintains the communication link with the processing node through the processor hardware resource with the programmable circuitry powered off.

6. The integrated circuit of claim 1, wherein the processor system further comprises an additional hardware resource that is a memory located within the processor system.

7. The integrated circuit of claim 1, wherein the processor hardware resource is selectively coupled to an input/output (I/O) pin of the integrated circuit that is dedicated to the processor system or to the programmable circuitry.

8. The integrated circuit of claim 7, wherein data generated from the processor hardware resource is provided to the I/O pin of the integrated circuit that is dedicated to the processor system and is generated on a data line coupled to a fabric input/output multiplexer coupled to the programmable circuitry.

9. The integrated circuit of claim 1, wherein the processor system comprises a clock unit configured to generate a first clock signal distributed within the processor system, wherein the clock unit is configured to provide a second clock signal to the programmable circuitry.

10. The integrated circuit of claim 1, further comprising a hardware locking mechanism configured to permit one of the processor system or the programmable circuitry to control the processor hardware resource at a time.

11. The integrated circuit of claim 10, wherein only the processor system or the programmable circuitry, when granted control over the processor hardware resource services the interrupt generated by the processor hardware resource.

12. The integrated circuit of claim 1, wherein the programmable circuitry comprises a user circuit coupled to the processor system via an interface, wherein the processor system is configured to implement an I/O function from a library of executable I/O functions, wherein the processor system is configured to provide the I/O function to the user circuit in response to a request from the user circuit received via the interface.

13. The integrated circuit of claim 1, wherein the processor system is configured to implement the physical circuit within the programmable circuitry by loading configuration data specifying the physical circuit into a configuration memory of the programmable circuitry.

14. The integrated circuit of claim 13, wherein the processor system is configured to receive the configuration data via an input/output (I/O) device of the processor system from a source external to the integrated circuit prior to loading the configuration data into the configuration memory.

15. The integrated circuit of claim 1, wherein the processor system controls powering of the programmable circuitry.

16. The integrated circuit of claim 15, wherein the programmable circuitry is powered on under control of the processor system from a power off state.

17. The integrated circuit of claim 16, wherein responsive to determining that the programmable circuitry completed a boot process, the processor system loads configuration data into configuration memory of the programmable circuitry.

18. The integrated circuit of claim 1, wherein the programmable circuitry is configured to be powered off under control of the processor system while the processor system remains powered on and operational.

19. The integrated circuit of claim 18, further comprising a plurality of level shifters coupling the processor system and the programmable circuitry, wherein each of the plurality of level shifters is placed in a known state responsive to the programmable circuitry powering off under control of the processor system.

* * * * *